(12) United States Patent
Xu

(10) Patent No.: US 8,128,839 B2
(45) Date of Patent: Mar. 6, 2012

(54) HIGH-LUMINOSITY STRESS-STIMULATED LUMINESCENT MATERIAL, MANUFACTURING METHOD THEREOF, AND USE THEREOF

(75) Inventor: Chao-Nan Xu, Tosu (JP)

(73) Assignee: National Institute of Advanced Industrial Science & Technology, Tokyo (JP)

( * ) Notice: Subject to any disclaimer, the term of this patent is extended or adjusted under 35 U.S.C. 154(b) by 953 days.

(21) Appl. No.: 11/547,660

(22) PCT Filed: Apr. 8, 2005

(86) PCT No.: PCT/JP2005/006971
§ 371 (c)(1),
(2), (4) Date: May 14, 2008

(87) PCT Pub. No.: WO2005/097946
PCT Pub. Date: Oct. 20, 2005

(65) Prior Publication Data
US 2008/0232083 A1 Sep. 25, 2008

(30) Foreign Application Priority Data

Apr. 9, 2004 (JP) .................................. 2004-116250

(51) Int. Cl.
*C09K 11/64* (2006.01)
(52) U.S. Cl. ............................................... 252/301.4 R
(58) Field of Classification Search .................. None
See application file for complete search history.

(56) References Cited

U.S. PATENT DOCUMENTS

| | | | |
|---|---|---|---|
| 5,424,006 A * | 6/1995 | Murayama et al. ..... | 252/301.4 R |
| 6,280,655 B1 * | 8/2001 | Xu et al. ............... | 252/301.4 R |
| 2002/0132897 A1 | 9/2002 | Xu et al. | |
| 2004/0120684 A1 | 6/2004 | Ishibashi et al. | |
| 2004/0191518 A1 | 9/2004 | Naito et al. | |
| 2006/0257661 A1 | 11/2006 | Naito et al. | |
| 2007/0029523 A1 | 2/2007 | Ishibashi et al. | |
| 2007/0042181 A1 | 2/2007 | Naito et al. | |

FOREIGN PATENT DOCUMENTS

EP 1 221 727 A 7/2002
(Continued)

OTHER PUBLICATIONS

Akiyama et al, "Influence of Eu, Dy co-doped strontium aluminate composition on mechanoluminescence intensity", Journal of Luminescence, 97, 2002, pp. 13-18.*

(Continued)

*Primary Examiner* — Carol M Koslow
(74) *Attorney, Agent, or Firm* — Nixon & Vanderhye PC

(57) ABSTRACT

The present invention provide a high-luminosity stress-stimulated luminescent material which emits visible light even in daylight, a manufacturing method thereof, and a typical example of the use thereof. The stress-stimulated luminescent material of the present invention satisfies conditions for light emission by at least one of: a luminescence mechanism using static electricity caused by friction; a luminescence mechanism using micro plasma caused by friction; a luminescence mechanism using a piezoelectric effect caused by strain; a luminescence mechanism using lattice defect; and a luminescence mechanism using thermal generation. For example, in case where a base material made of at least one type of aluminate is includes as the stress-stimulated luminescent material, the base material includes a crystal structure with spontaneous polarization, e.g. $\alpha$-$SrAl_2O_4$, in order to realize the luminescence mechanism using the piezoelectric effect caused by strain.

12 Claims, 18 Drawing Sheets

FOREIGN PATENT DOCUMENTS

| | | | |
|---|---|---|---|
| JP | 2001-49251 | | 2/2001 |
| JP | 2002-194349 | * | 7/2002 |
| JP | 2002-194349 A | | 7/2002 |
| JP | 2002-201068 | | 7/2002 |
| JP | 2002-220587 | | 8/2002 |
| JP | 2003-342561 | | 12/2003 |
| JP | 2003-342561 A | | 12/2003 |
| JP | 2004-71511 | | 3/2004 |
| JP | 2004-352797 | | 12/2004 |

OTHER PUBLICATIONS

Translation for JP 2002-194349—Jul. 10, 200.*

Akiyama et al, "Infuence of Eu, Dy co-doped strontium aluminate composition on mechanoluminescence intensity", Journ. Luminesc., 97, 2002, pp. 13-18.*

Office Action for Japanese Application No. 2006-512143 (National Phase in Japan of PCT Patent Appln. No. PCT/JP2005/006971), mailing date Jul. 14, 2009 and English translation.

International Search Report for PCT/JP2005/006971 dated Aug. 9, 2005 (English and Japanese).

Yun Liu et al., Influence of Calcining Temperature on Photoluminescence and Triboluminescence of Europium-Doped Strontium Aluminate Particles Prepared by Sol-Gel Process, The Journal of Chemistry B, May 1, 2003, vol. 107, No. 17.

Morito Akiyama et al., "Influence of Eu Co-Doped Strontium Aluminate Composition on Mechanoluminescence Intensity", Journal of Luminescence, 97 (2002), p. 13-18.

Chao-Nan Xu et al., "Strong elasticoluminescense from monoclinic-structure $SrAl_2O_4$" Applied Physics Letters, vol. 84, No. 16, Apr. 19, 2004, pp. 3040-3042.

Hiroaki Masui et al. "Origin of mechanoluminescence from Mn-activated Zn $Al_2O_4$: Triboelectricity-induced electroluminescence", Physical Review B, vol. 69, No. 23, Jun. 2004, pp. 235109-1-235109-7.

Partial English translation of relevant passages of document, 2002 and 2003.

* cited by examiner

F I G. 8
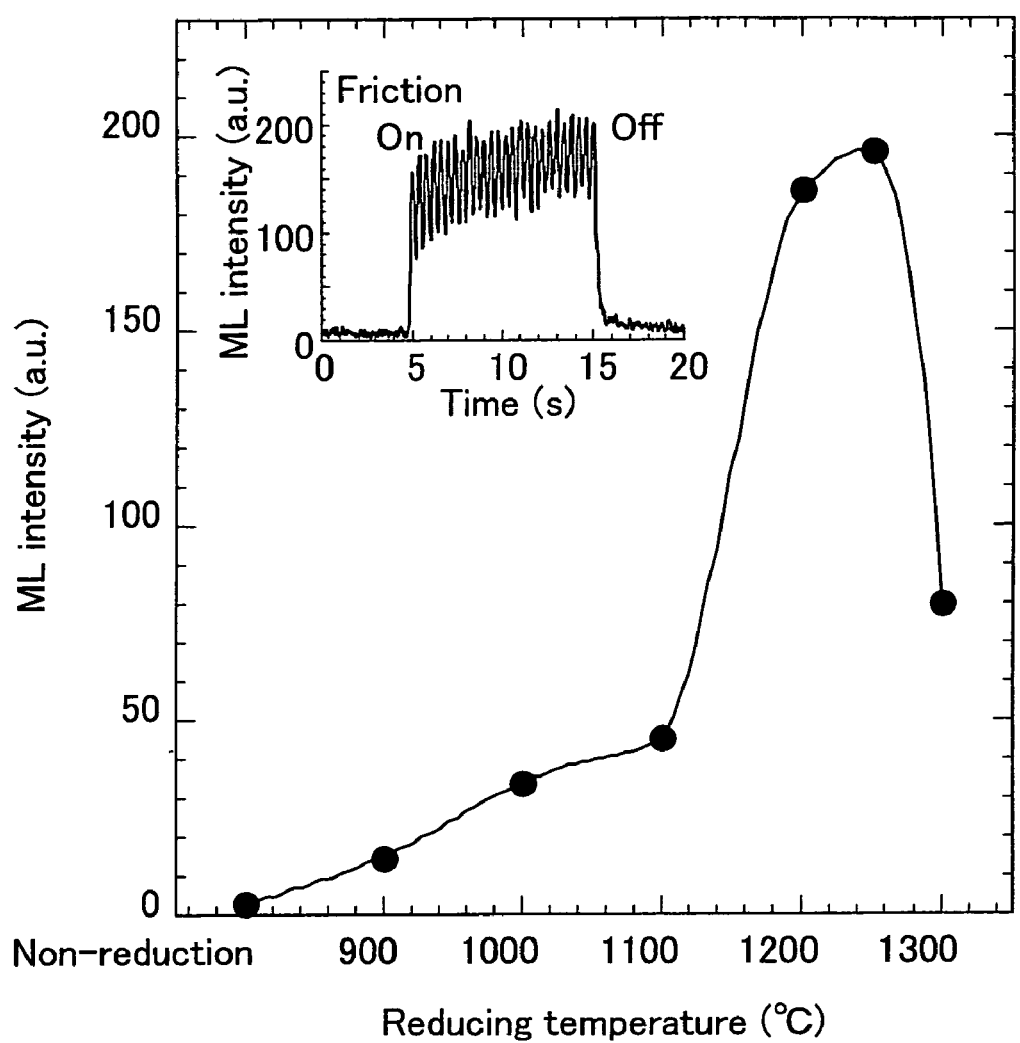

F I G. 9
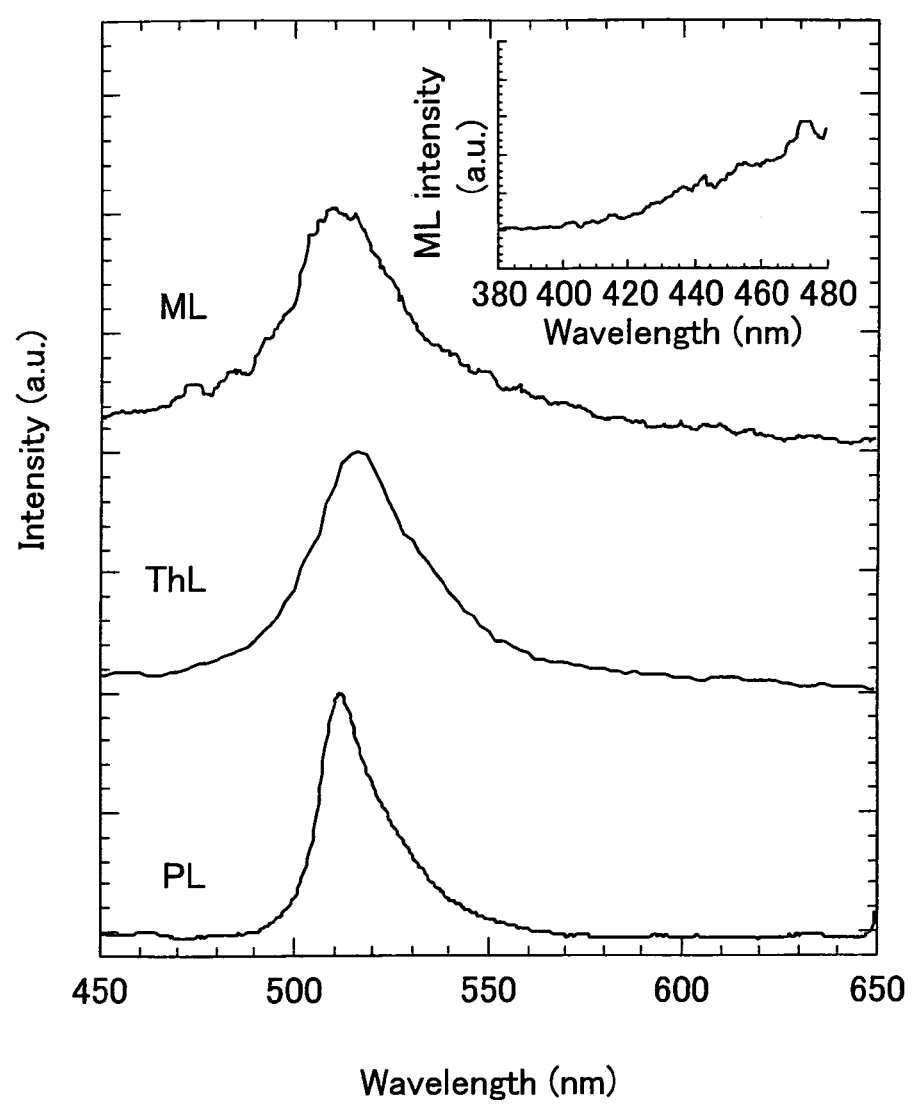

● : 3 minutes after UV irradiation
○ : 2 days after UV irradiation

Defect-structured spinel
ZnAl$_2$O$_4$:Mn
after reduction
at 1200°C

F I G. 1 5
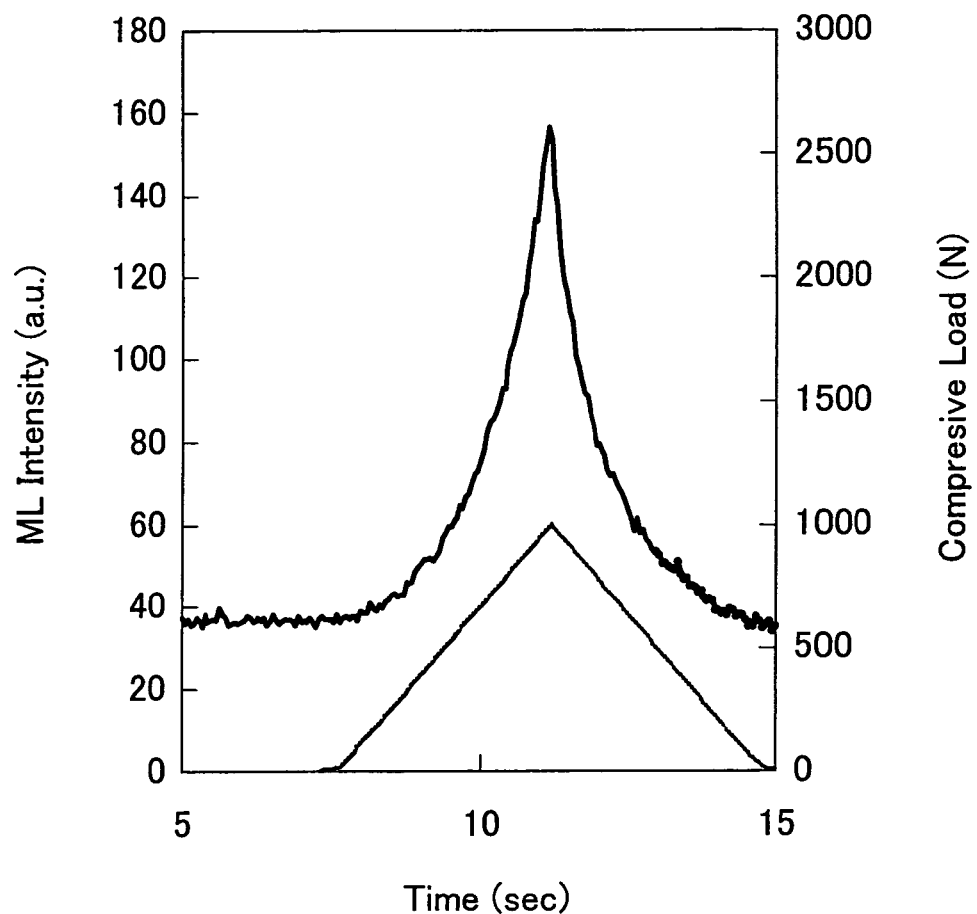

HIGH-LUMINOSITY STRESS-STIMULATED LUMINESCENT MATERIAL, MANUFACTURING METHOD THEREOF, AND USE THEREOF

This application is the US national phase of international application PCT/JP2005/006971 filed 8 Apr. 2005, which designated the U.S. and claims priority of JP 2004-116250, dated 9 Apr. 2004, the entire contents of each of which are hereby incorporated by reference.

TECHNICAL FIELD

The present invention relates to a stress-stimulated luminescent material which emits light in response to mechanical stress, a manufacturing method thereof, and the use thereof. The present invention particularly relates to a stress-stimulated luminescent material which is highly luminous and has a broader range of applications, a manufacturing method thereof, and a typical example of the use of the stress-stimulated luminescent material, such as a light emission method by which the stress-stimulated luminescent material effectively emits light.

BACKGROUND ART

Stress-stimulated luminescent materials which emits light in response to internal stress caused by a mechanical effect such as friction, shearing, impact, and vibration have conventionally been proposed. Known examples of the base material of such stress-stimulated luminescent materials include aluminate, silicate, and semiconductor found in nature. More specifically, for example, the inventors of the present invention have proposed (1) a high-luminosity stress-stimulated luminescent material made up of at least one type of aluminate of a non-stoichiometric composition and including a material which includes lattice defect causing luminescence when a carrier excited by mechanical energy returns to the ground state. A specific example of such a material is $M_xAl_2O_{3+x}$ (where M is Mg, Ca, Sr, or Ba, and $0.8<x<1$). (For example, see Document 1: Japanese Laid-Open Patent Application No. 2001-49251; published on Feb. 20, 2001.)

The inventors have also proposed (2) a stress-stimulated luminescent material whose base material is an oxide constituted by a compound represented as $MN_2O_4$ (where M and N are metal elements selected from a group of Mg, Sr, Ba, and Zn and a group of Ga and Al, respectively). (See, for example, Document 2: Japanese Laid-Open Patent Application No. 2002-194349; published on Jul. 10, 2002).

The inventors have also proposed, as an example of a manufacturing method of a high-luminosity stress-stimulated luminescent material, a method of manufacturing aluminate by a sol-gel process, the aluminate being represented by a general formula $M_xAl_yO2_{x+3y/2}$ (where M is an alkaline earth metal, a transition metal, or a rare-earth metal, x and y are integers, and the alkaline earth metal as M is a metal element selected from a group of Mg, Ca, Ba, and Sr). (See, for example, Japanese Laid-Open Patent Application No. 2002-220587; published on Aug. 9, 2002).

The conventional stress-stimulated luminescent materials can effectively emit light by mechanical stress, but the light emission luminescence is sometimes insufficient. The applications and uses of the stress-stimulated luminescent materials are therefore limited.

More specifically, under a circumstance where the light intensity of outside light is relatively low, the above-described stress-stimulated luminescent materials can perform stress-stimulated luminescence with an intensity sufficient for visual observation. On the other hand, in case where the light intensity of outside light is as high as daylight, i.e. under a fairly bright circumstance, the light emission luminescence of the stress-stimulated luminescent material may be relatively low and not sufficient for visual observation.

Strong luminous intensity sufficient for visual observation under a bright circumstance is required to broaden the range of uses and applications of luminescent materials. A stress-stimulated luminescent material which can achieve such strong light emission cannot be practically obtained by conventional techniques.

DISCLOSURE OF INVENTION

The invention was done to solve the above-described problem, and the objective of the present invention is to provide a high-luminosity stress-stimulated luminescent material which emits visible light even in daylight, a manufacturing method thereof, and a typical example of the use thereof.

As a result of the diligent research on the problem, by clarifying the luminescence mechanism of the stress-stimulated luminescent material, the inventors independently found that stress-stimulated luminescence with a luminous intensity higher than ever could be realized. Also, the inventors completed the invention by finding out an effective luminescence method of the stress-stimulated luminescent material, based on the clarified luminescence mechanism.

That is, the stress-stimulated luminescence material of the present invention emits light in response to a mechanical effect, the stress-stimulated luminescent material being characterized by satisfying a condition to emit light based on at least one of: a luminescence mechanism using static electricity caused by friction; a luminescence mechanism using micro plasma caused by friction; a luminescence mechanism using a piezoelectric effect caused by strain; a luminescence mechanism using lattice defect; and a luminescence mechanism using thermal generation.

An example of the above-described stress-stimulated luminescent material further includes a base material constituted by at least one type of aluminate, the base material including a crystal structure having spontaneous polarization, in order to realize the luminescence mechanism using the piezoelectric effect caused by strain.

The most preferable example of the above-described stress-stimulated luminescent material is arranged such that the base material is $\alpha\text{-SrAl}_2O_4$.

The above-described stress-stimulated luminescent material is preferably arranged such that, to realize the luminescence mechanism using the lattice defect, at least two types of metal ions are added, as central ions of defect center, to the base material. As a result of the addition of the central ions, the lattice defect is formed in the crystal structure having the spontaneous polarization in the base material. Also, in the stress-stimulated luminescent material, the crystal structure has a tunnel structure, and an element is provided in the tunnel by ionic bond. In other words, the central ions are provided in the tunnel.

More specifically, the added central ions substitute Sr sites of the $\alpha\text{-SrAl}_2O_4$, for example. In this case, if the metal ions added as the central ions are smaller in ion diameter than the Sr, the metal ions may be an element selected from the group consisting of Mg, Na, Zn, Cu, Eu, Tm, Ho, Dy, Sn, Mn, Nd, Pr, and Ca. On the other hand, if the metal ions added as the central ions are larger in ion diameter than the Sr, the metal ions may be Ba and/or K.

It is particularly preferable that the central ions are both larger and smaller in ion diameter than the Sr. It is also preferable that the total amount of the metal ions which are added as the central ions and substitute the Sr sites of the $\alpha$-SrAl$_2$O$_4$ is 0.1 to 40 mol % of the Sr, and more preferably 5-25 mol % of the Sr. In case where the added central ions are both larger and smaller in ion diameter than the Sr, the total amount of the metal ions is smaller than stoichiometry.

The stress-stimulated luminescent material of the present invention may be arranged such that the added central ions substitute the Al sites of the $\alpha$-SrAl$_2$O$_4$. In this case, if the ion diameter of the metal ions added as the central ions is shorter than the diameter of the Al, the metal ions are preferably Si or B, for example. If the ion diameter of the metal ions added as the central ions is longer than the diameter of the Al, the metal ions are preferably Ga or In, for example. The metal ions added as the central ions and substituting Al sites of the $\alpha$-SrAl$_2$O$_4$ is preferably 0.1 to 20 mol % of the Al.

The above-described stress-stimulated luminescent material is preferably arranged such that the metal ions added as the central ions are made up of two or more types of metal ions having different valence. For example, positive univalent metal ions and positive bivalent metal ions may be simultaneously added, positive bivalent metal ions and positive tervalent metal ions may be simultaneously added, or univalent metal ions, positive bivalent metal ions, and positive tervalent metal ions may be simultaneously added.

In the stress-stimulated luminescent material in which the base material has a crystal structure with spontaneous polarization, the luminescence is in proportion to the strain energy of the material.

Another example of the stress-stimulated luminescent material includes a base material constituted by at least one type of aluminate, the base material including a structure having symmetrical center, in order to realize the luminescence mechanism using the static electricity and micro plasma caused by the friction.

The above-described stress-stimulated luminescent material is preferably arranged such that, to realize the luminescence mechanism using the lattice defect, at least one type of ions is added, as central ions of defect center, to the base material.

A specific example of the stress-stimulated luminescent material is arranged such that the base material is a spinel-structured material with a Zn—Al—O defect structure, and more specifically, the base material is ZnAl$_2$O$_4$:Mn. It is preferable that the base material is subjected to reduction at a temperature range in which the lattice defect is formed.

A manufacturing method of a stress-stimulated luminescent material, which emits light in response to a mechanical stress, is characterized by controlling a structure to satisfy a condition to emit light based on at least one of: a luminescence mechanism using static electricity caused by friction; a luminescence mechanism using micro plasma caused by friction; a luminescence mechanism using a piezoelectric effect caused by strain a luminescence mechanism using lattice defect; and a luminescence mechanism using thermal generation.

The above-described manufacturing method is preferably arranged such that, to realize the luminescence mechanism using the piezoelectric effect caused by strain, raw materials are mixed and burned in such a manner as to form, in a base material included in the stress-stimulated luminescent material, a crystal structure with spontaneous polarization. It is also preferable that, to realize the luminescence mechanism using the lattice defect, at least one type of metal ions is added, as central ions of defect center, to the base material in the stress-stimulated luminescent material. It is also preferable that, to realize the luminescence mechanism using the static electricity and micro plasma caused by strain, raw materials are mixed and burned in such a manner as to form, in the base material included in the stress-stimulated luminescent material, a structure having symmetrical center. It is also preferable that, to realize the luminescence mechanism using the thermal generation, raw materials are mixed and burned in such a manner as to cause thermo-luminescence of the base material in the stress-stimulated luminescent material to peak around a use temperature of the stress-stimulated luminescent material. The thermo-luminescence preferably has plural peaks. It is also preferable that the thermo-luminescence show plural peaks around a use temperature in range of 100° C.

Non-limiting examples of the use of the present invention are a stress-stimulated luminescent body formed by molding the above-described stress-stimulated luminescent material, and a stress-stimulated luminescent body formed by mixing the above-described stress-stimulated luminescent material with a polymeric material and molding them into a flat plate. The method and form of the molding are not particularly limited. In particular, in case where the stress-stimulated luminescent material including a crystal structure with spontaneous polarization is used, a stress-stimulated luminescent body including a laminated structure in which the above-described stress-stimulated luminescent material is provided on a supporting body is preferable. In this case, it is more preferable to include a diaphragm structure.

Another example of the use of the present invention is a luminescence method of a stress-stimulated luminescent material, which is characterized in that characterized by applying an external force to the above-described stress-stimulated luminescent body, the external force changing over time. In this case it is preferable that ultraviolet light is applied while the external force changing overtime is applied to the stress-stimulated luminescent body. Also, in the case of a stress-stimulated luminescent material having the luminescence mechanism using friction, the stress-stimulated luminescent material is preferably rubbed by a friction material.

Non-limiting example of the friction material is a material having a high electric resistance. More specifically, a material having volume resistivity of not less than $10^{14}$ $\Omega$cm at 25° C. and 50% RH is preferable. An example of such a material is polyethylene.

Additional objects, features, and strengths of the present invention will be made clear by the description below. Further, the advantages of the present invention will be evident from the following explanation in reference to the drawings.

BRIEF DESCRIPTION OF DRAWINGS

FIG. 8 is a graph showing, in Example 1, to what extent the thermo-luminescence of $ZnAl_2O_4$:Mn, which is an example of the stress-stimulated luminescent material, depends on reduction, and also showing the response curve of friction luminescence.

FIG. 9 is a chart which relates to Example 1 and shows spectrums of fluorescence (PL), thermo-luminescence (ThL), and friction luminescence (ML) of the stress-stimulated luminescent material.

FIG. 15 is a graph showing the relationship between luminous intensity and stress in case where the $\alpha$-$SrAl_2O_4$ phase coexists with another phase in Example 3.

BEST MODE FOR CARRYING OUT THE INVENTION

Figure 1:
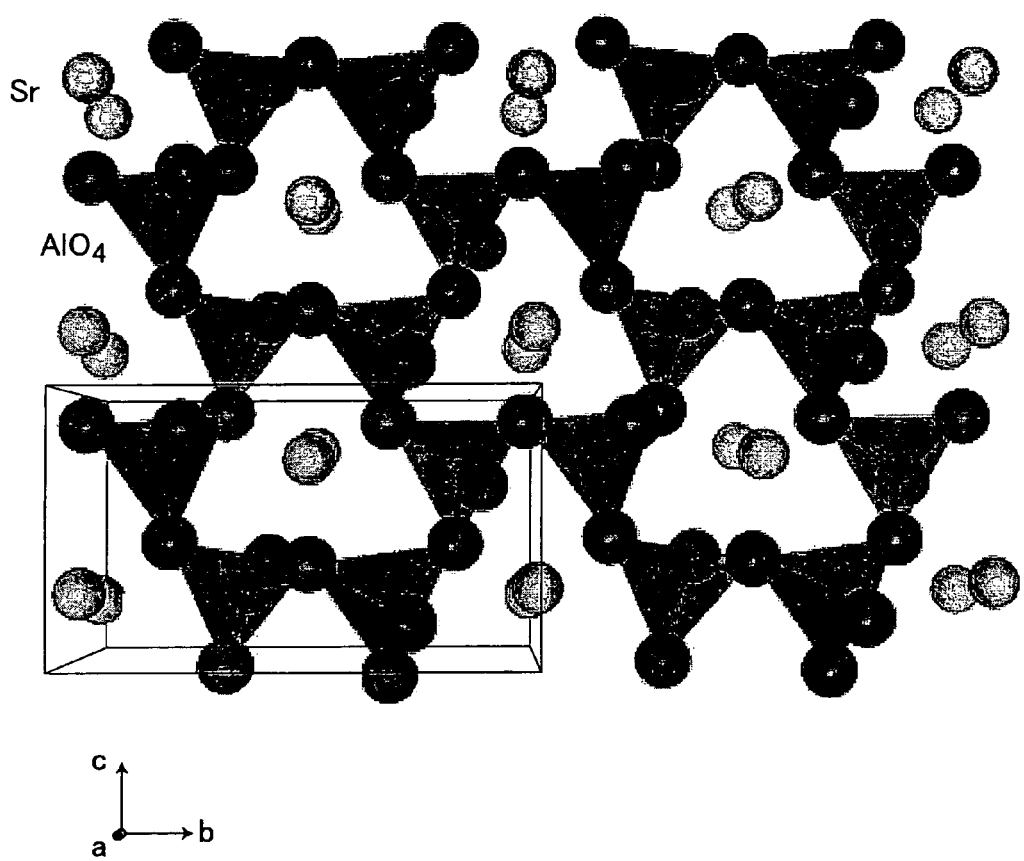
FIG. 1 is a schematic diagram showing the structure of $\alpha$-SrAl$_2$O$_4$ which is an example of a stress-stimulated luminescent material of the present invention.
Figure 2:
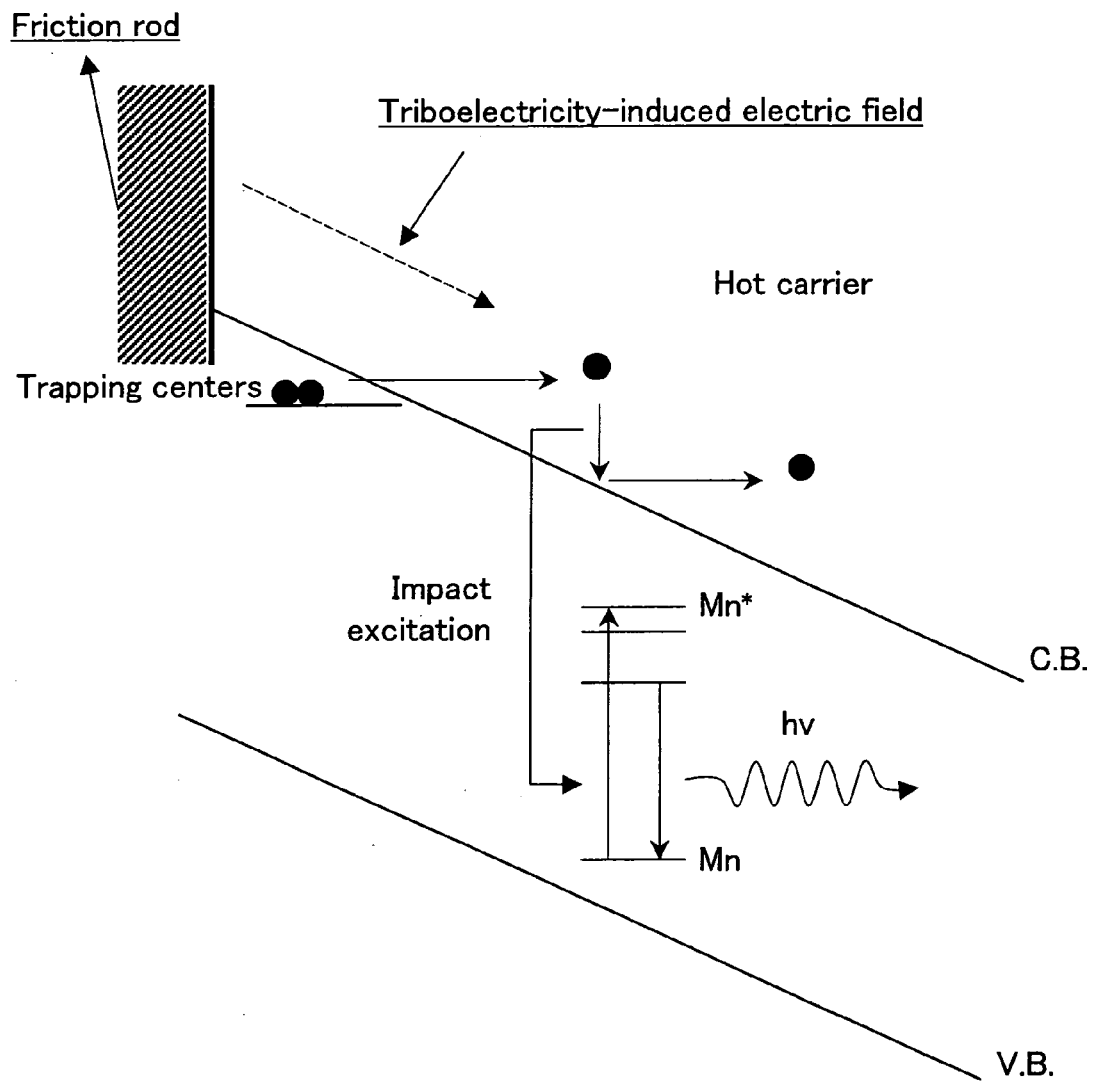
FIG. 2 is a schematic diagram illustrating the excitation mechanism of electroluminescence in a friction luminescent material and the occurrence of static electricity in the friction luminescent material, in the stress-stimulated luminescent material of the present invention.
Figure 3:
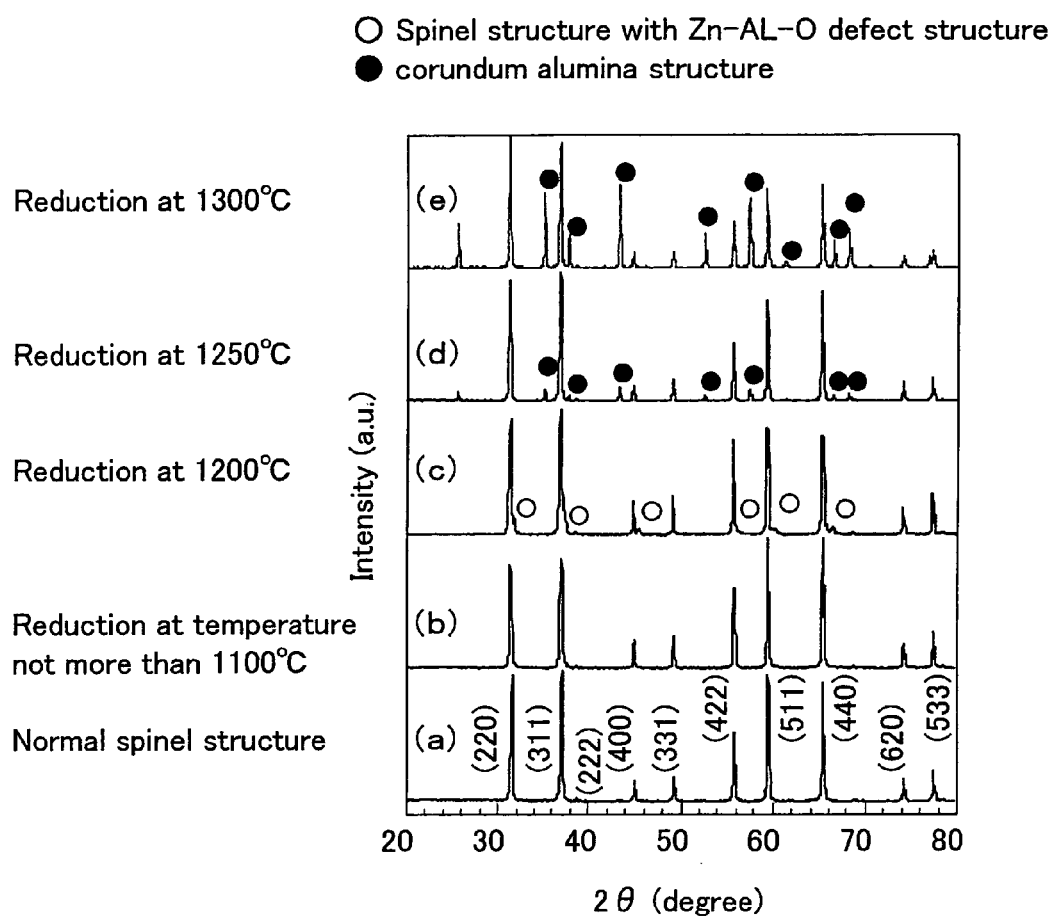
FIG. 3 is a chart showing the XRD pattern of the Zn—Al—O stress-stimulated luminescent material of Example 1.

The following will describe an embodiment of the present invention in reference to FIGS. 1 and 2. It is noted that the present invention is not limited to this embodiment. In the following, a luminescence mechanism of stress-stimulated luminescent materials, by which the present invention is completed, a stress-stimulated luminescent material of the present invention and its manufacturing method, and the use of the present invention will be discussed in this order, in a detailed manner.

(I) Luminescence Mechanism of Stress-Stimulated Luminescent Material

Various types of high-luminosity stress-stimulated luminescent materials have been proposed, and obtained luminescence characteristics differ according to the types of applied external force. However, details of the luminescence mechanism were not clear. In regard of this, the inventors for the first time found out the luminescence mechanism by clarifying the excitation source required for luminescence caused by a mechanical effect. The inventors also found out the crystal structure, composition, and effective luminescence method of the high-luminosity stress-stimulated luminescent material.

More specifically, the present invention was done to manufacture a stress-stimulated luminescent material which emits light based on any one of: a luminescence mechanism using static electricity caused by friction; a luminescence mechanism using micro plasma caused by friction; a luminescence mechanism using a piezoelectric effect caused by strain; and a luminescence mechanism using thermal generation.

(I-1) Luminescence Mechanism of Luminescence by Friction

Luminescence of a stress-stimulated luminescent material which emits light by friction is achieved by at least one of the following mechanisms: generation of static electricity by friction; generation of micro plasma by friction; existence of lattice defect; and thermal generation by friction.

More specifically, luminescence is achieved in such a manner that static electricity is generated by friction or the like, and local electroluminescence is caused by the static electricity. Alternatively, luminescence is achieved in such a manner that micro plasma is generated because the surface atomic bond is broken by friction, and hence plasma excitation occurs. Also, as described below, in case where lattice defect exists, luminescence occurs in such a manner that electrons or positive holes (holes) trapped in the lattice defect are released by friction and the released electrons and holes are recombined. Also, as described below, there is a mechanism in which light emission occurs because of thermal generation by friction. In particular, materials with a structure having symmetry center can easily achieve luminescence by friction, even if the materials cannot easily achieve luminescence by strain. This is because the crystal structure on the surface is asymmetric.

In other words, to construct a luminance mechanism of a stress-stimulated luminescent material which emits light by friction, the raw materials of the stress-stimulated luminescent material are mixed and burned so that the base material of the stress-stimulated luminescent material have a structure including symmetry center. In the present invention, as described below, a spinel crystal material having a Zn—Al—O defect structure is used as an example of a material which emits intense light in response to friction excitation.

(I-2) Luminescence Mechanism of Luminescence by Strain Energy

Luminescence of a stress-stimulated luminescent material which emits light by strain energy is achieved by at least one of the following mechanisms: a piezoelectric effect by strain energy; lattice defect by strain energy; and thermal generation by deformation by strain energy.

Luminescence by a piezoelectric effect occurs in such a manner that strain energy is generated in a material by application of a deforming force, electricity is generated by a piezoelectric effect caused by the strain energy, and hence electroluminescence occurs. The material which emits light on account of a piezoelectric effect is therefore a piezoelectric substance. On this account, the crystal structure is required not to have symmetry center. Also, a material without symmetry center is particularly required to have a structure in which spontaneous polarization exists.

In other words, to construct the luminance mechanism of a stress-stimulated luminescent material which emits light in response to a piezoelectric effect by strain, the raw materials of the stress-stimulated luminescent material are mixed and burned so that a crystal structure having spontaneous polarization is formed in the base material of the stress-stimulated luminescent material. The present invention, as described below, takes a crystal material with a $\alpha$-$SrAl_2O_4$ phase as an example of a material which emits intense light by a piezoelectric effect. As to the luminescence by lattice defect and the luminescence by thermal generation, the next chapter will deal with them because those types of luminescence are similar to the luminescence by friction, as described above.

(I-3) Luminescence Mechanism Shared Between Friction and Deformation

As described above, the luminescence mechanisms by lattice defect and thermal generation can be realized in both luminescence by friction and luminescence by deformation.

More specifically, in the case of luminescence by lattice defect, electrons and positive holes (holes) trapped in the lattice defect of the material on account of friction and strain energy are recombined, so that luminescence is achieved. More specifically, when friction or strain energy is applied, the crystal field around the center of the lattice defect changes on account of the strain. This excites the trapped electrons or positive holes, and these electrons and positive holes are recombined. As a result, luminescence occurs. On this account, the site where the lattice defect occurs preferably has a loosely-bound in the crystal and is at a position susceptible to strain in the crystal. The arrangement of the lattice defect in the material is therefore quite important.

In other words, to achieve the luminance mechanism of a stress-stimulated luminescent material which emits light by lattice effect, at least one type, preferably more than one type of metal ions is added, as central ions of defect center, to the base material in the stress-stimulated luminescent material. As described below, in the present invention, metals are added in a crystal material with a $\alpha$-$SrAl_2O_4$ phase, in such a manner that Sr sites and Al sites are substituted by metal ions.

In the case of luminescence by thermal generation, a material generates heat in response to friction, deformation causes the material to deform, and hence the heat is generated with this deformation. Luminescence by thermal generation is based on thermo-luminescence by the thermal generation (temperature increase). In the luminescence mechanism using thermo-luminescence, the position and form of the peak of the thermo-luminescence are important. In consideration of the use of the stress-stimulated luminescent material or the like, the peak of the thermo-luminescence is preferably around the use temperature of the stress-stimulated luminescent material. For example, in case where the use temperature of the stress-stimulated luminescent material is around room temperatures (15-25° C.), the peak of the thermo-luminescence is preferably around this temperature range. More preferably, there are plurality of peaks in the thermo-luminescence. It is also preferable that the thermo-luminescence show plural peaks around a use temperature in range of 100° C.

In other words, to construct the luminance mechanism of a stress-stimulated luminescent material which emits light by thermal generation, the raw materials of the stress-stimulated luminescent material are mixed and burned in such a manner that the peak of the thermo-luminescence of the base material in the stress-stimulated luminescent material is around the use temperature of the stress-stimulated luminescent material.

(II) Stress-Stimulated Luminescent Material of Present Invention and Manufacturing Method Thereof To summarize the chapter (I), there are at least four types of luminescence mechanisms of a stress-stimulated luminescent material: friction, piezoelectric effect by strain, lattice defect, and thermal generation. It is possible to obtain a synergistic effect of the luminescence mechanisms by materials which can adopt at least one type of, preferably more than one type of, and more preferably all types of the luminescence mechanisms. It is therefore possible to achieve luminescence which is higher than ever. It is noted that luminescence by lattice defect and thermal generation may be attenuated over time.

As a result of numerous experiments based on the above-described idea, the inventors successfully developed high-luminosity stress-stimulated luminescent materials. The following will describe, as stress-stimulated luminescent materials of the present invention, the most preferable examples of (1) a material which emits strong light by friction and (2) a material which emits strong light by deformation.

(II-1) Material Emitting Storing Light by Friction

Among the stress-stimulated luminescent materials of the present invention, a material which emits light by friction (hereinafter, this material will be referred to as friction-luminescent material for convenience) performs stress-stimulated luminescence by at least one of: (1) electroluminescence caused by static electricity generated by friction or the like; (2) plasma luminescence caused by micro plasma generated by friction; (3) luminescence by recombination of electrons and positive holes trapped in lattice defect; and (4) thermo-luminescence caused by heat generated by friction. When electroluminescence is caused, the aforesaid material is regarded as a good electroluminescent material. Since the friction-luminescent material emits light in response to friction at the contact surface, the static electricity, the intensity of the micro plasma, and the temperature variation are different according to the material (friction material) with which the friction occurs. Also, the static electricity, the intensity of the micro plasma, and the temperature variation are different according to environments. These properties may be degraded on account of water or moisture.

Although not particularly limited, the friction-luminescent material of the present invention includes a base material made of at least one type of aluminate, and the base material includes a structure having symmetry center in order to achieve the luminescence mechanism using friction. The term "structure having symmetry center" indicates structures such as a perovskite structure, spinel structure, and columbite structure. Details of the luminescence mechanism of the friction-luminescent material will be given in FIG. 2.

The friction-luminescent material of the present invention preferably can perform electroluminescence and plasma luminescence, in addition to the structure in which the base material has symmetric center. Moreover, the material can preferably retain an electric potential, i.e. the material preferably has high charge-retaining property and long decay time. As shown in an Example below, high-luminosity stress-stimulated luminescence (friction luminescence) is achieved by electrogenicity by friction and electroluminescence. That is, electroluminescence is achieved when the crystal of the material has lattice effect. Since it is possible to simultaneously realize both the luminescence mechanism using friction and the luminescence mechanism using lattice defect, high-luminosity stress-stimulated luminescence is achieved.

Specific examples of the friction-luminescent materials including a structure having symmetric center include: $ZnAl_2O_4$:Mn, $ZnGa_2O_4$:Eu, $MgAl_2O_4$:Ce, $MgGa_2O_4$:Mn, and $CaNa_2O_6$:Tb. In particular, a material with a spinel structure having a Zn—Al—O defect structure, such as $ZnAl_2O_4$:Mn, is preferably used. As described above, the material with such a structure can simultaneously achieve the electroluminescence mechanism using friction, the plasma luminescence mechanism, and the luminescence mechanism using lattice defect. Moreover, the material can also exert high thermo-luminescence as described in Examples below.

That is, it has been known that light-storing materials have high thermo-luminescence, and the thermo-luminescence thereof is peaked around room temperatures. It is therefore clear that all types of light-storing materials emit light in response to thermal generation by friction.

<Manufacturing Method of Friction-Luminescent Material>

The manufacturing method of the friction-luminescent material of the present invention is not particularly limited, and any publicly-known methods can be suitably used. More specifically, materials with a certain composition ratio are mixed in an oxidative atmosphere so that a host crystal structure is formed. In the friction-luminescent material of the present invention, the base material is preferably reduced in the temperature range at which the lattice defect is formed. This makes it possible to surely and efficiently manufacture a material with a spinel structure having a Zn—Al—O defect structure.

(II-2) Material Emitting Intense Light in Response to Strain Caused by Elastic Deformation Among the stress-stimulated luminescent materials of the present invention, a material (hereinafter, this material will be referred to as strain luminescence material for convenience), which emits intense light on account of strain caused by elastic deformation such as compression stress and tensile stress, is, as described above, a stress-stimulated luminescent material which emits light by a luminescence mechanism using at least one of a piezoelectric effect, lattice defect, and thermal generation on account of strain.

<Luminescence Mechanism Using Piezoelectric Effect>

Although not particularly limited, the strain luminescent material of the present invention is arranged such that the base material includes a crystal structure including spontaneous polarization, in order to realize the luminescence mechanism using a piezoelectric effect by strain. More specifically, an example of the base material is $\alpha$-$SrAl_2O_4$.

It has been known that materials represented as $xSrO.yAl_2O_3$ (e.g. $Sr_3Al_2O_6$, $Sr_2Al_6O_{11}$, $SrAl_4O_7$, and $Sr_4Al_{14}O_{25}$) emits light in response to stress, irrespective of the composition. It is found that these materials actually shares a structure of $SrAl_2O_4$.

The $\alpha$-$SrAl_2O_4$ is mono-crystal, and the crystal phase thereof has spontaneous polarization. As described in Examples below, crystal structures which are not mono-crystal does not have spontaneous polarization. A crystal phase having spontaneous polarization performs stress-stimulated luminescence in an elastic range.

Since the crystal phase, with spontaneous polarization is ferroelectric, the strain luminescent material which performs stress-stimulated luminescence in an elastic range is also ferroelectric. The stress-stimulated luminescence in this case is carried out in such a manner that strain energy by piezo-electricity is converted to electricity, and light emission is performed by electroluminescence. Therefore, the strain luminescent material is an electroluminescent material, with a synergic effect of piezoelectric and electroluminescence. That is to say, a strain luminescence material which realize the luminescence mechanism using a piezoelectric effect by strain is ferroelectric, and is an electroluminescent material.

As described above, regarding the strain luminescent material, it is important that the symmetry center does not exist in the crystal structure. Therefore, apart from $\alpha$-$SrAl_2O_4$, it is possible to effectively use materials in which symmetry center does not exist in the crystal structure, for the base material of the present invention. For example, many types of materials can be used apart from aluminate. Examples of such materials include tungstate, niobate, and titanate.

<Luminescence Mechanism Using Lattice Defect>

Apart form the luminescence mechanism using a piezo-electric effect by strain, as described above, the strain luminescent material of the present invention may adopt a luminescence mechanism using lattice defect. More specifically, for example, at least one type of metal ions is added to the base material, as central ions of the defect center. In particular, in case where the base material includes a crystal structure with spontaneous polarization, the lattice defect is formed in the crystal structure with spontaneous polarization in the base material, by adding the aforesaid central ions.

For example, in case where, for example, the base material is $\alpha$-$SrAl_2O_4$, the structure of $\alpha$-$SrAl_2O_4$ is, as shown in FIG. 1, arranged such that the frame is formed by 6 tetrahedrons of $AlO_4$, and Sr is provided in the tunnel. The central ions are added in such a manner as to substitute Sr or Al sites. As a result of this, the lattice defect is formed in the crystal structure with spontaneous polarization. In this manner, the present invention prefers, as the base material, a material in which the crystal structure has a tunnel structure, and an element placed in the tunnel is preferably a material placed by ionic bond.

In case where the added central ions substitute the Sr sites of $\alpha$-$SrAl_2O_4$, there are two cases: metal ions added as the central ions are smaller in diameter than the Sr; and those metal ions are larger in diameter than the Sr. In this manner, the luminous intensity in the elastic range is further improved by adding metal ions whose diameter is different from Sr in order to cause the crystal structure to be easily strained.

The metal ions which are smaller in diameter than the Sr are not particularly limited, and hence any metal ions of I-VIII group can be used. Since the diameter of $Sr^{2+}$ ions is 0.132 nm, metal ions whose diameter is shorter than this are selected. Specific examples of such ions are as follows: Ca, Mg, Na, Ti, Zr, V, Nb, Ta, Cr, Mn, Co, Ni, Sn, Cu, Zn, Y, Cd, Mo, Ta, W, Fe, La, Ce, Pr, Nd, Sm, Eu, Gd, Tb, Dy, Ho, Er, Tm, Yb, and Lu. One of these metal ions is used or more than one of these metal ions are used in combination.

Among these ions, at least one ion selected from the group constituted by Mg, Na, Zn, Cu, Eu, Tm, Ho, Dy, Sn, Mn, Nd, Pr, and Ca is preferably used. Using the metal ions selected from this group, it is possible to cause the crystal structure to be easily strained, thereby improving the luminous intensity in the elastic range.

The metal ions which are larger in diameter than the Sr are not particularly limited, either. Specific examples of such ions include Ba, K, and Pb. Ba and/or K is particularly preferable. One of these metal ions is used or more than one of these metal ions are used in combination.

The Sr sites are preferably substituted by both types of ions which are larger and smaller in diameter than the Sr. This further facilitates the strain of the crystal structure, and hence the luminous intensity in the elastic range is improved.

In the above-described stress-stimulated luminescent material, at least two types of metal ions having different valency are preferably added as metal ions added as the central ions. For example, when the metal ions are Sr as above, since Sr is positive bivalent ions ($Sr^{+2}$), it is preferable to add metal ions with different valency, i.e. positive univalent, positive tervalent, positive quadrivalent, positive quinquevalent or positive sexivalent metal ions. This is advantageous in that lattice defect is effectively formed.

As described above, in the case of the example of $\alpha$-$SrAl_2O_4$, the structure has a high degree of freedom because Sr sites are structurally in the tunnel in frame formed by $AlO_4$. As a result, as described above, the Sr sites can be substituted by various types of metal ions. The same goes for cases where base material is different from $\alpha$-$SrAl_2O_4$. In this manner, the tunnel structure and an easy-to-strain structure are advantageous for stress-stimulated luminescence.

An amount of metal ions added as the central ions and substituting the Sr sites of $\alpha$-$SrAl_2O_4$ are not particularly limited, on condition that the crystal structure of $\alpha$-$SrAl_2O_4$ is maintained. The amount is preferably in the range of 0.1-40 mol % of Sr. Provided that the amount of metal ions falls within the aforesaid range, the crystal structure is maintained but easily strained. This makes it possible to effectively improve the luminous intensity in the elastic range.

In case where metal ions smaller in diameter than the Sr and metal ions larger in diameter than the Sr are both added as the central ions, the total amount of the metal ions is preferably smaller than stoichiometry. With this, it is possible to further improve the luminous intensity in the elastic range.

In case where the added central ions substitute Al sites of $\alpha$-$SrAl_2O_4$, there are two cases: metal ions added as the central ions are smaller in diameter than Al; and the metal ions are larger in diameter than Al. The Al sites are tetrahedrons of $AlO_4$. On this account, there are not many choices of substituting metal ions, as compared to Sr sites.

The diameter of $Al^{3+}$ ions is 0.053 nm. Examples of metal ions smaller in diameter than the $Al^{3+}$ ions are B and Si, and B is preferable. The luminous intensity is further improved by adding B. On the other hand, examples of metal ions which are larger in diameter than Al ions are Ga, In, Tl, Zr, Ti, V, and Nb. Among these metal ions, Ga and In are preferable.

Being similar to the metal ions substituting the Sr sites, the metal ions substituting Al sites are preferably both smaller and larger in diameter than Al. The amount of the metal ions substituting the Al sites is not particularly limited, on condition that the crystal structure of $\alpha$-$SrAl_2O_4$ is maintained. The amount is preferable 0.1-20 mol % of Al.

<Luminescence Mechanism Using Thermal Generation>

In addition to the luminescence mechanisms using a piezoelectric effect by strain and using lattice defect, the strain luminescent material of the present invention may adopt a luminescence mechanism using thermal generation. A friction-luminescent material may have this luminescence mechanism. More specifically, for example, all types of light-storing materials can emit light in response to thermal generation by friction.

<Manufacturing Method of Strain Luminescent Material>

A manufacturing method of the strain luminescent material of the present invention is not particularly limited. Any publicly-known manufacturing methods are used in such a manner that the crystal structure with which the aforesaid luminescence mechanism is realized is formed. More specifically, in the case of $\alpha$-$SrAl_2O_4$, the raw materials are mixed and burned in such a manner as to form a crystal structure with spontaneous polarization in the base material. Examples of the raw materials are $SrCO_3$ and $Al_2O_3$. To add metal ions which function as central ions of the defect center, oxides of the metal ions are mixed into the material or the material which eventually becomes oxide. In Examples below, $Eu_2O_3$ is added because the central ions are Eu. The present invention, however, is not limited to this case.

The conditions of the burning are not particularly limited. Predetermined amounts of materials are mixed so that a desired ratio of ions are included, and the burning is carried out with publicly-known burning conditions. In Examples below, the burning step is carried out after tentative burning in the air. This makes it possible to achieve an optimum crystal structure and lattice defect level. The burning step is carried out in any types of inactive gas atmosphere. To the atmosphere, a predetermined amount of gas such as $H_2$ may be added according to need. The burning temperature falls in the range of 1000-1700° C. in Examples below, but not necessarily in this range. The burning can be carried out in a publicly-known temperature range, on condition that the crystal structure is sufficiently formed.

(III) Use of Present Invention

The use of the present invention is not limited to any particular field. The present invention can be used in any fields where stress-stimulated luminescence of the above-described stress-stimulated luminescent material is performed. For example, the stress-stimulated luminescent material is manufactured to have a specific form and used as a stress-stimulated luminescent body.

(III-1) Stress-Stimulated Luminescent Body

The specific arrangement of the stress-stimulated luminescent body is not particularly limited. Examples of the arrangement of the stress-stimulated luminescent body are (1) powder and sintered body, (2) molded article in which the stress-stimulated luminescent body is mixed with another material, and (3) the stress-stimulated luminescent body is applied onto the surface of a supporting material. In the case of the powder and sintered body, the stress-stimulated luminescent material of the present invention is used almost without any alterations. The particle diameter and particle size distribution of the powder and the shape and size of the sintered body are not particularly limited.

In case where the stress-stimulated luminescent material of the present invention is mixed with another material and molded, for example, when the luminescence mechanism using strain is adopted, the stress-stimulated luminescent material is mixed with a polymeric material and molded into a flat plate. A non-limiting examples of the material mixed with the stress-stimulated luminescent material is epoxy resin. The amount of the material to be mixed is not particularly limited, on condition that the stress-stimulated luminescent material can be molded into a flat plate and the shape can be maintained. In Examples below, the weight ratio is 1:1.

The conditions at the time of the mixture are not particularly limited, either. Publicly known methods can be used.

In case where the stress-stimulated luminescent material is applied to the surface of the supporting material, for example, a laminated structure in which a layer of the stress-stimulated luminescent material is provided on the supporting body may be used. When a laminated structure is formed, non-limiting examples of the supporting body on which the stress-stimulated luminescent material layer is provided are metal, fiber, rubber, fabric, polymeric material, paper, glass, and ceramics. When luminescence is achieved by low strain energy, a material with a low elastic coefficient is preferable. If the elastic coefficient is too low, the variation speed of the strain is low and hence the strain energy is low. As a result the luminous efficiency is not good and the luminous intensity is low if compared with a case where a material is under a certain identical stress. For this reason, it is undesirable that the elastic coefficient is too low. Examples of the supporting material satisfying the requirement above are synthetic resins such as acrylic resin and epoxy resin and elastomeric materials such as paper and rubber. In particular, as described in Example, paper is preferable because very bright visible light is emitted in response to touch by a finger, even if external light is intense such as sunlight.

Even if the elastic coefficient is low, the stress-stimulated luminescence is not so high in the case of materials which has high stress relaxation e.g. elastomeric materials such as rubber. This is presumably because the variation speed of the stress is slowed. To put it differently, the luminous intensity is changed when the supporting material is an elastomeric material, even if the stress to be applied is not changed. The supporting material is therefore suitably selected in consideration of the use and desired luminous intensity.

Any types of methods can be used for providing the stress-stimulated luminescent material of the present invention on the supporting body. The material in the form of paste or paint may be applied using a publicly-known method, or a film-shaped material may be provided on the surface of the supporting body. The thickness of the applied stress-stimulated luminescent material is not particularly limited, either. Typically the thickness preferably falls within the range of 1-1000 µm, and more preferably falls within the range of 10-500 µm. When the thickness is in these ranges, the stress-stimulated luminescent material is efficiently strained by applying stress.

To provide the stress-stimulated luminescent material on the supporting body, a publicly-known adhesive may be used. In particular, the durability of the stress-stimulated luminescent body is improved when an adhesive which has an adhesive strength corresponding to the supporting body is selected. This makes it possible to effectively avoid the cracking and breaking of the stress-stimulated luminescent body on account of repetitive or continuous application of stress. Non-limiting and preferable examples of the adhesive are silicon, polyimide, starch, polyvinyl-vinyl acetate copolymer, epoxy resin, polyamide resin, and cyanoacrylate adhesives. Such adhesives are preferable because of low stress relaxation as compared to other types of adhesives and a high adhesion force.

The shape of the stress-stimulated luminescent body with a laminated structure is not particularly limited, and the stress-stimulated luminescent body may have any shapes on condition that a deforming force is efficiently applied. The stress-stimulated luminescent body is preferably thin-film-shaped or film-shaped, and more preferably has a diaphragm structure. The diaphragm structure is a bulkhead structure using a flexible film, and used for a variety of uses such as detecting the variation of pressure and generating displacement. In the present invention, the diaphragm structure is preferable because an applied deforming force is effectively used for stress-stimulated luminescence.

For example, the diaphragm structure is constructed using the bottom of a paper cup, in Example below. The stress-stimulated luminescent material of the present invention is provided on the bottom of the paper cup (i.e. paper as the supporting body), so that the stress-stimulated luminescent body with the diaphragm structure is formed.

(III-2) Luminescence Method

The use of the present invention includes a luminescence method of the stress-stimulated luminescent material of the present invention. Since the luminescence method is not particularly limited, a suitable method is selected in consideration of the luminescence mechanism of the stress-stimulated luminescent material.

<Luminescence Mechanism Using Friction>

Concretely speaking, in the case of a stress-stimulated luminescent material adopting the luminance mechanism using friction, for example, luminescence is achieved by rubbing, using an optional friction material, the stress-stimulated luminescent material or a stress-stimulated luminescent body which is made of the stress-stimulated luminescent material and has a suitable shape.

A non-limiting and suitable example of the friction material is a material which excels in an electrostatic force (electromotive force) by friction, micro plasma by friction, recombination by friction of electrons and positive holes trapped in lattice defect, or thermo-luminescence by friction. In other words, according to the luminescence mechanism using friction, the electromotive force, micro plasma, recombination of electrons and positive holes, and thermo-luminescence depend on the type of the friction material cause thermo-luminescence. The friction material is therefore selected in accordance with a desired luminescence level.

Since high luminous intensity is basically preferable, a friction material which is suitable for the above-described four types of luminescence mechanisms is preferable. Although the friction material is not particularly limited, the friction material preferably has high electric resistance. More specifically, the friction material has volume resistivity (25° C., 50% RH) of not less than $10^{14}$ Ωcm, more preferably has electric resistance of not less than $10^{16}$ Ωcm. A preferable example of such a material is polyethylene. More specifically, in the case of a base material with a spinel structure having a Zn—Al—O defect structure, as described in Examples below, polyethylene is preferable as the friction material, because the material is suited to the aforesaid four types of luminescence mechanisms. The surface of the friction material is preferably antiwear-coated.

<Luminescence Mechanism Using Deforming Force>

In the case of the luminescence mechanism using a piezoelectric effect or lattice defect (or thermal generation), i.e. in the case of the stress-stimulated luminescent material adopting the luminescence mechanism using deforming force, luminescence is achieved by applying an external force to a flat-plate-shaped stress-stimulated luminescent body or a stress-stimulated luminescent body having a laminated structure.

It has been know that, in a stress-stimulated luminescent body with a structure such as lattice defect, the stress-stimulated luminescence conspicuously peaks after the application of intense ultraviolet light or radiation, and then the stress-stimulated luminescence is kept at a certain level after attenuation. On this account, according to the luminescence method of the stress-stimulated luminescent material of the present invention, ultraviolet light may be applied to the stress-stimulated luminescence material while an external force is applied thereto. As a result of this, it was found that the stress-stimulated luminescence without attenuation was achieved. The irradiation conditions of ultraviolet light and radiation are not particularly limited. The conditions suitable for effective stress-stimulated luminescence are selected. For example, since the irradiation time is not particularly limited, ultraviolet light may be applied for a certain length of time or applied as pulses. The irradiation intensity is not particularly limited, either, and may be determined in line with publicly-known methods. However, the wavelength identical with luminescence length is not used, because the measurement of the luminescence becomes difficult.

(III-3) Specific Applications of Present invention

In the present invention, the aforesaid luminescence method of the stress-stimulated luminescent body and the stress-stimulated luminescent material is used so that the stress-stimulated luminescent material of the present invention can be used for concrete technical fields. For example, the present invention can be used for developing new pressure sensors and vital function measuring sensors such as a pressure sensor operable in a severe temperature environment and a sheet-shaped pressure sensor which is thin and flexible. Also, using the stress-stimulated luminescent material of the present invention as a sensing material and integrating the material with a publicly-known system or a system to be developed in future, it is possible to create a new field of sensing. In particular, present invention realizes direct visualization, and measurement at two or three dimensions.

EXAMPLES

The present invention will be specifically described by Examples. The present invention is not limited to these examples, and may be varied in many ways. Such variations are not to be regarded as a departure from the spirit and scope of the invention, and all such modifications as would be obvious to one skilled in the art are intended to be included within the scope of the following claims.

Example 1

Among the stress-stimulated luminescent materials of the present invention, a material adopting the luminescence mechanism using friction will be specifically described in reference to FIGS. 3-12.

ZnO, $Al_2O_3$, and $MnCO_3$ were weighed so as to satisfy $Zn_{0.95}Mn_{0.05}Al_2O_4$, and sufficiently mixed in ethanol. Then the mixed substances were dried and crushed. Subsequently, the substances were burned in the air at 1250° C. and for 8 hours, and a sample was obtained as a result. Analyzing the crystal structure of the sample using an X-ray diffractometer, it was found that a material with a pure spinel structure was obtained as shown in FIG. 3(a).

Figure 4:
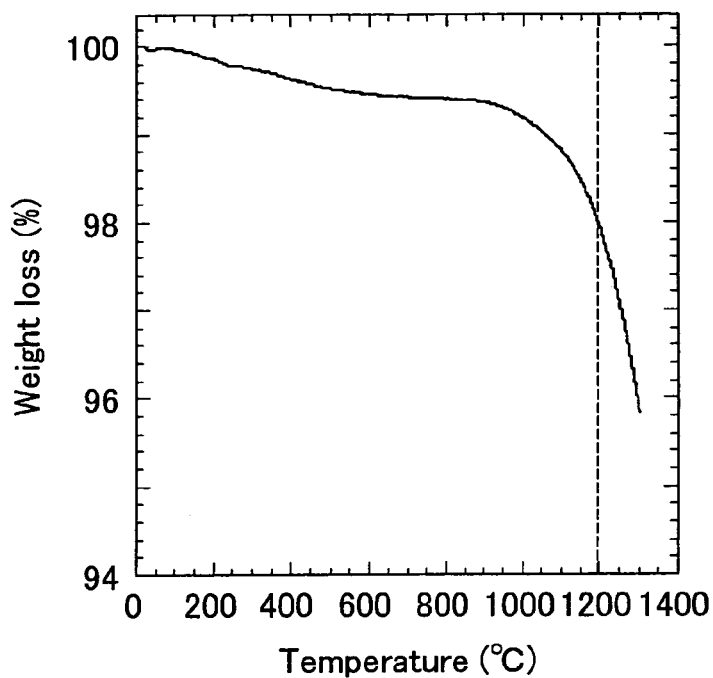
FIG. 4 is a graph illustrating the weight loss curve in case where the Zn—Al—O stress-stimulated luminescent material is reduced.

Thereafter, the obtained material ($ZnAl_2O_4$:Mn) with the spinel structure was reduced in 5% $H_2$—Ar, at temperatures of 300-1300° C. FIG. 4 shows the weight loss curve during the reduction. The weight loss at temperatures not higher than 600° C. was caused by the desorption of adsorbed water and oxygen. The weight rapidly decreased at 1200° C., because of the desorption of Zn and O in the spinel crystal. As a result of this, it was found that the reduction at temperatures at which the lattice defect was generated was effective for manufacturing a material with the spinel structure having the defect structure.

Figure 5:
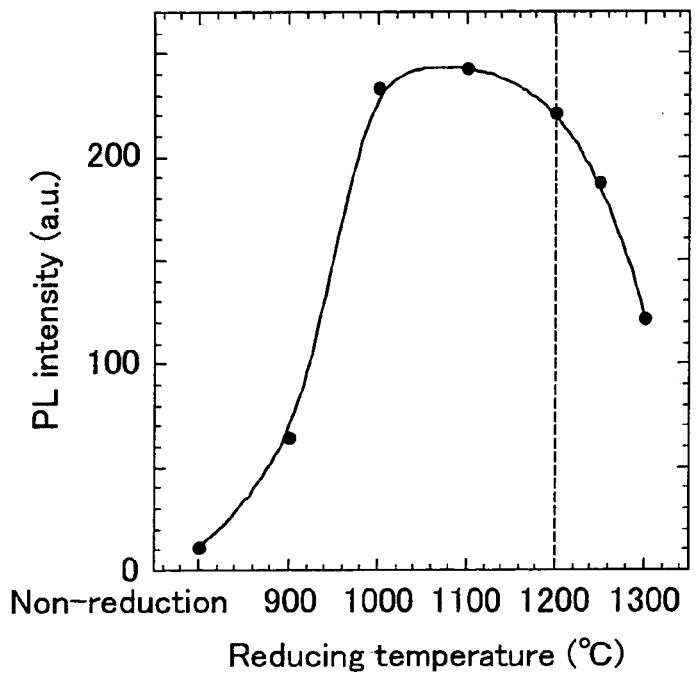
FIG. 5 is a graph showing the fluorescence intensity of the Zn—Al—O stress-stimulated luminescent material.

FIG. 5 shows a graph of the fluorescence intensity at the time of the reduction. As the graph clearly shows, the fluorescence intensity of the material with the spiel structure having the defect structure started to decrease when the temperature exceeds 1200° C.

Figure 6:
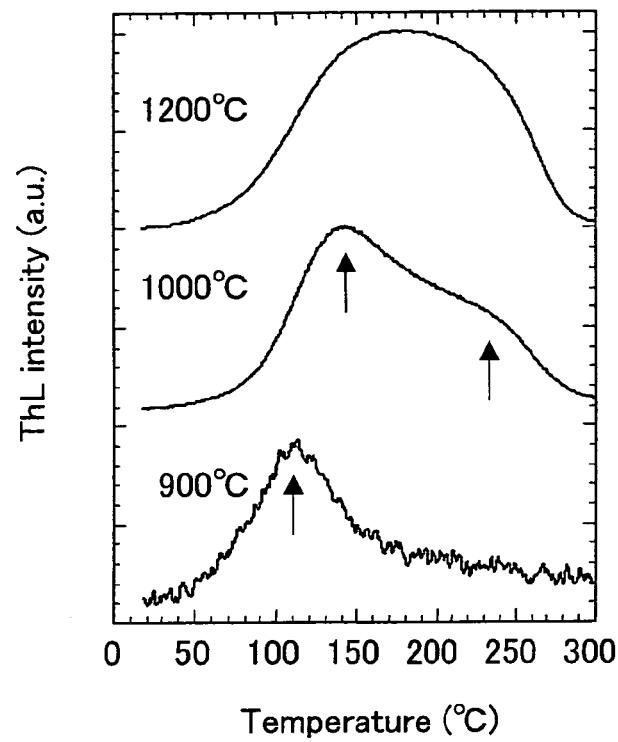
FIG. 6 is a chart showing the thermo-luminescence of the Zn—Al—O stress-stimulated luminescent material.
Figure 7:
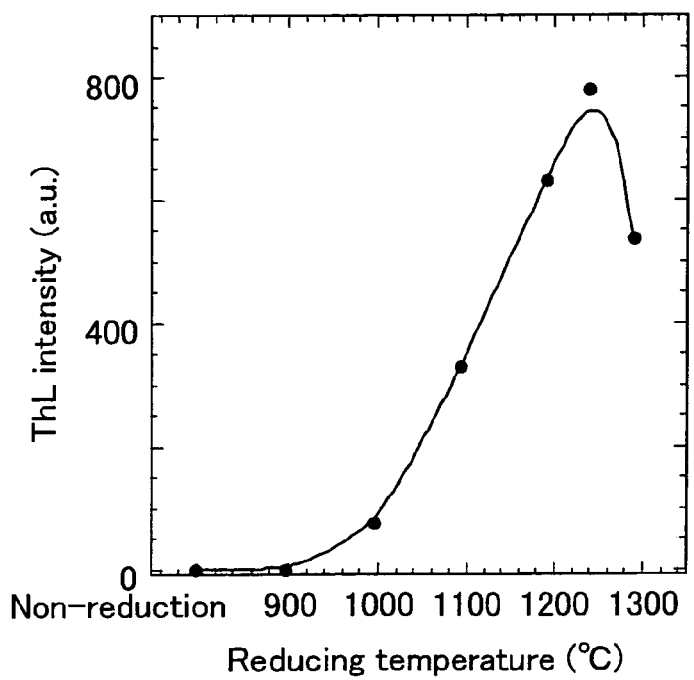
FIG. 7 is a graph illustrating, in Example 1, to what extent the thermo-luminescence of $ZnAl_2O_4$:Mn, which is an example of the stress-stimulated luminescent material, depends on a reduction temperature.
Figure 10:
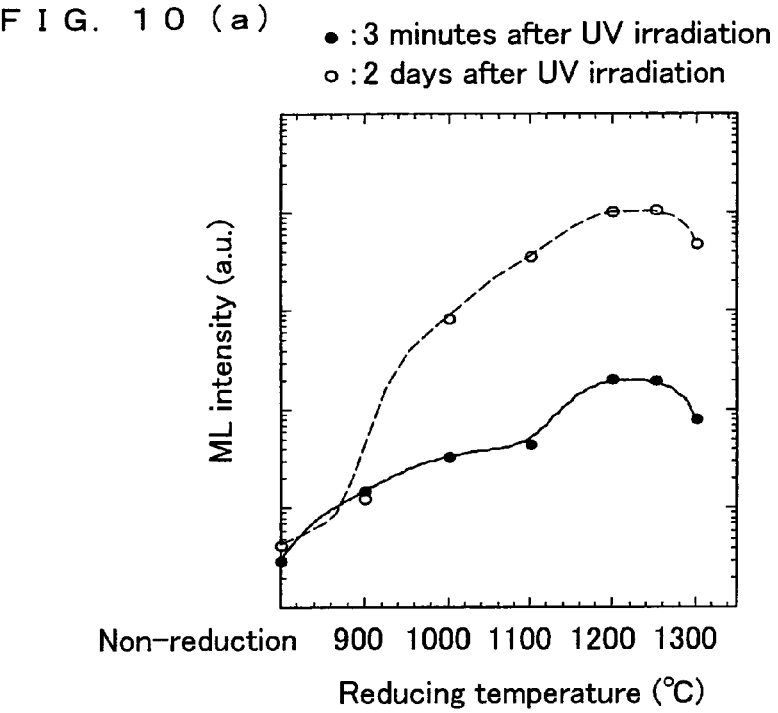
FIG. 10(a) is a graph showing the correlativity between the reduction temperature and the friction luminous intensity in Example 1.
FIG. 10(b) is a graph showing, in Example 1, the relationship between the afterglow intensity and friction luminous intensity of $ZnAl_2O_4$:Mn after the reduction at 1200° C.
Figure 10:
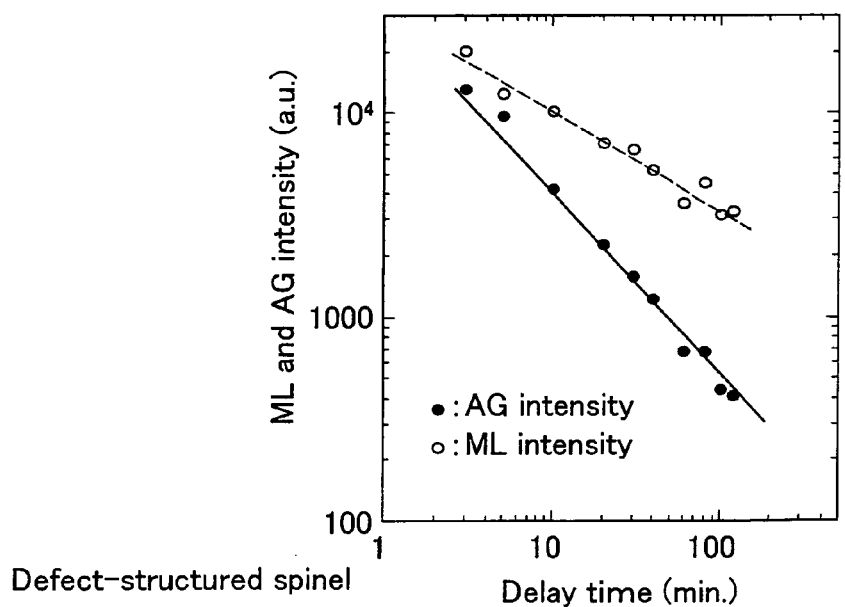
Figure 11:
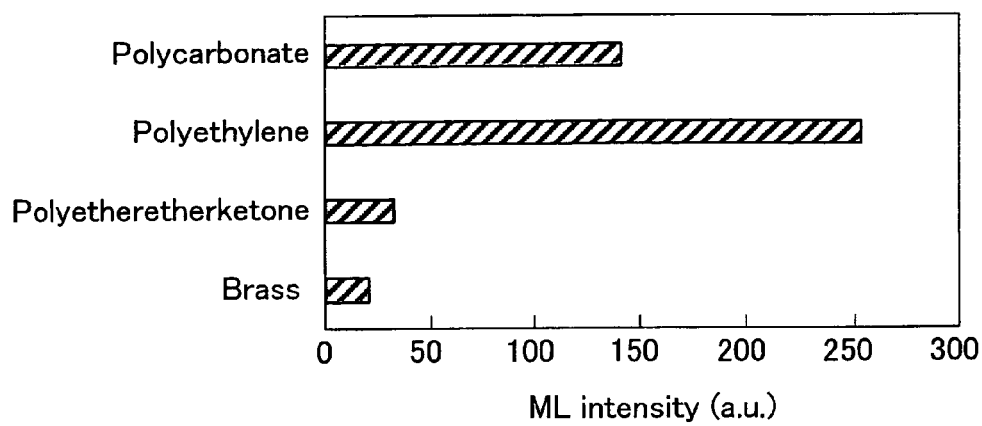
FIG. 11(a) is a graph illustrating the intensity of friction luminescence of each friction material in Example 1.
FIG. 11(b) is a graph illustrating the surface potential of each friction material in Example 1.
Figure 11:
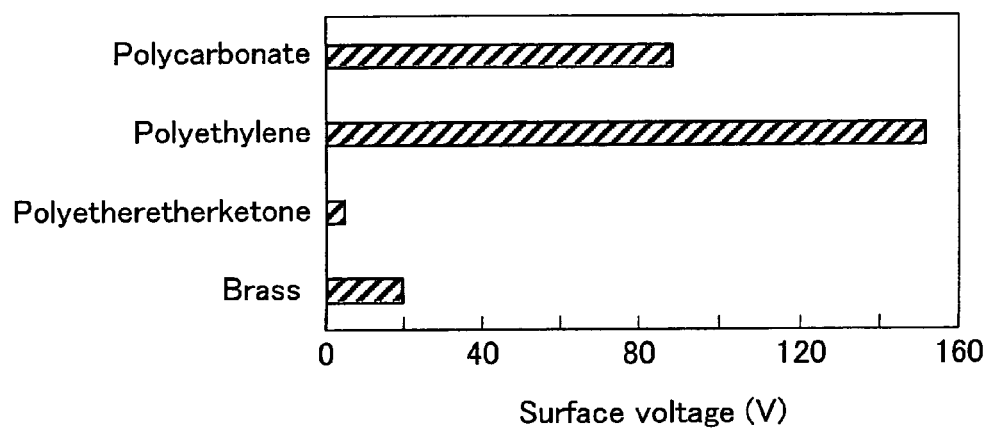

An experimentation about thermo-luminescence of above-described $ZnAl_2O_4$:Mn was carried out using a fluorescence spectral photometer, with temperature increase at the rate of 10° C./min. The result of this experimentation is shown in FIG. 6. As the result clarifies, the thermo-luminescence of the material with the spinel structure having the defect structure was the highest as compared to materials with other structures.

As samples for a friction experimentation, two types of pellets were used: a pellet of $ZnAl_2O_4$:Mn ceramics and a pellet in which $ZnAl_2O_4$:Mn powder is mixed with epoxy resin. The mixed pellet was obtained by mixing a friction-luminescent material ($ZnAl_2O_4$:Mn) of 1 g with epoxy resin of 3.5 g and molded into a pellet of Φ25×15 mm. The friction experimentation was carried out as follows: the friction experimentation samples were fixed on a sample table of a friction testing machine, and the samples were rubbed at a predetermined load (2N) and a predetermined experimentation speed (2.8 cm/s). The friction luminescence was measured using a photo counter, so that the reduction temperature dependency was evaluated. The result of this experimentation is shown in the graph in FIG. 7. As the graph clearly illustrates, the intensity of the thermo-luminescence of the material with the spinel structure having the defect structure started to decrease when the temperature exceeded 1200° C. Also, the reduction dependency of the friction luminous intensity and the response curve of the friction luminescence were evaluated, as shown in the graph in FIG. 8. It was found that the material with the spinel structure having the defect structure exhibited high friction luminescence.

Regarding $ZnAl_2O_4$:Mn, the spectrums in the cases of fluorescence (PL), thermo-luminescence (ThL), and friction luminescence (ML) were measured using a multi-channel spectrometer. FIG. 9 shows the results of the measurements. As clearly shown in the figure, it was found that the observed friction luminescence was caused not by $N_2$ gas discharge but by the central ions (Mn) in $ZnAl_2O_4$:Mn, because the luminescence did not peak around the range of 380-480 nm at which luminescence by $N_2$ gas discharge is typically peaked.

Thereafter, ultraviolet light is irradiated for one hour by a UV lamp with 365 nm, and then afterglow and friction luminescence were measured in a dark room. By doing so, the correlativity between the afterglow intensity and the stress-stimulated luminescence (friction luminescence) was measured. FIGS. 10(a) and 10(b) shows the results. FIG. 10(a) shows the correlativity between the reduction temperature and the friction luminous intensity. FIG. 10(b) shows the relationship between the afterglow intensity and the friction luminous intensity, regarding $ZnAl_2O_4$:Mn having been subjected to the reduction at 1200° C. According to these results, it was found that the friction luminescence was kept for a long time even if the afterglow decreased.

Regarding the aforesaid $ZnAl_2O_4$:Mn, the correlativity of the friction luminescence and the surface potential was then analyzed, by measuring the surface potential by using a surface electrometer concurrently with the measurement of the friction luminescence. The results are shown in FIGS. 11(a) and 11(b). FIG. 11(a) shows the intensity of the friction luminescence of each friction material. FIG. 11(b) shows the surface potential of each friction material. As the results clearly show, the luminescence at the time of rubbing the $ZnAl_2O_4$:Mn by the friction material was caused by the surface potential generated by the friction. It was also found that the luminous intensity was high when an electrostatic force caused by friction was high. The experimentation proved that polycarbonate and polyethylene were preferable to brass and polyether ether ketone. Polyethylene was particularly preferable.

Figure 12:
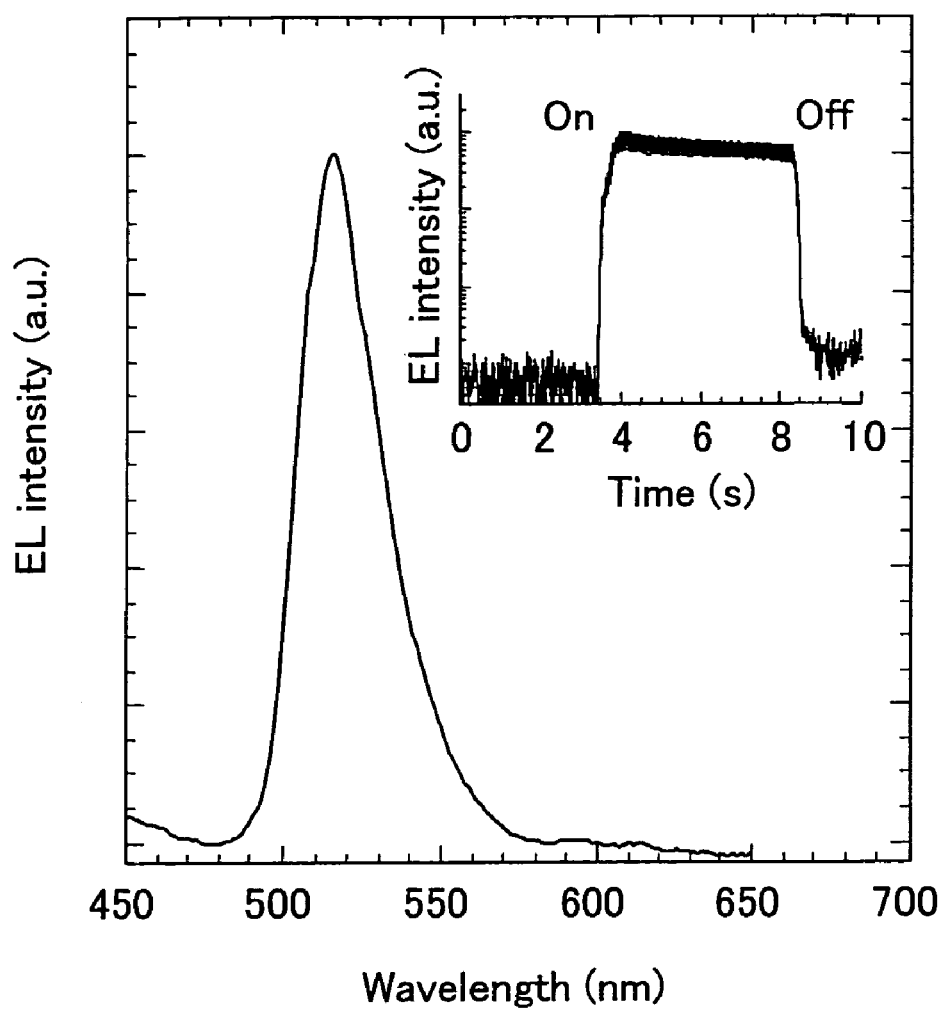
FIG. 12 is a chart illustrating an electroluminescent spectrum of the stress-stimulated luminescent material in Example 1.

Then, as a sample for electroluminescence, a powdered spinel-structured material (Zn—Al—O) with a defect structure was molded into a pellet of Φ20×1 mm, at a hydrostatic pressure of 2 t/cm². The sample was then reduced in 5% $H_2$—Ar. On the both surfaces of the obtained defected-spinel-structured ceramics, an Al electrode and an ITO transparent electrode were formed. Using such a sample, the electroluminescent spectrum was measured by a fluorescence spectral photometer, while a DC voltage of 1.5V was applied to the sample. The result of this measurement is shown in FIG. 12. Since the result shows that there was a peak around 520 nm, the material with the spinel structure having the defect structure had high electroluminescence.

Example 2

High purity reagents $SrCO_3$, $Al_2O_3$, and $Eu_2O_3$ were weighed so as to satisfy $Sr_{0.99}Eu_{0.01}Al_{12}O_{19}$, $Sr_{0.99}Eu_{0.01}Al_4O_7$, $Sr_{3.99}Eu_{0.01}Al_{14}O_{25}$, $Sr_{0.99}Eu_{0.01}Al_2O_4$, and $Eu_{0.01}Sr_{2.99}Al_2O_6$, and were sufficiently mixed with one another. Thereafter, the mixed reagents were tentatively burned at 800° C. in the air, and then the burning was carried out at a temperature range of 1000-1700° C. and in the atmosphere of Ar+5% $H_2$. As a result, stress-stimulated luminescent bodies with the aforesaid compositions were obtained. As a result of examining the crystal structure of each of the obtained stress-stimulated luminescent bodies by X-ray diffraction, it was found that the crystal structure was pure.

The obtained particulate (powder) stress-stimulated luminescence material was mixed with epoxy resin at a weight ratio of 1:1, and a rectangular-parallelepiped sample (i.e. a stress-stimulated luminescent body) of 54 mm, 19 mm, and 5 mm in length, width and height was formed.

Figure 13:
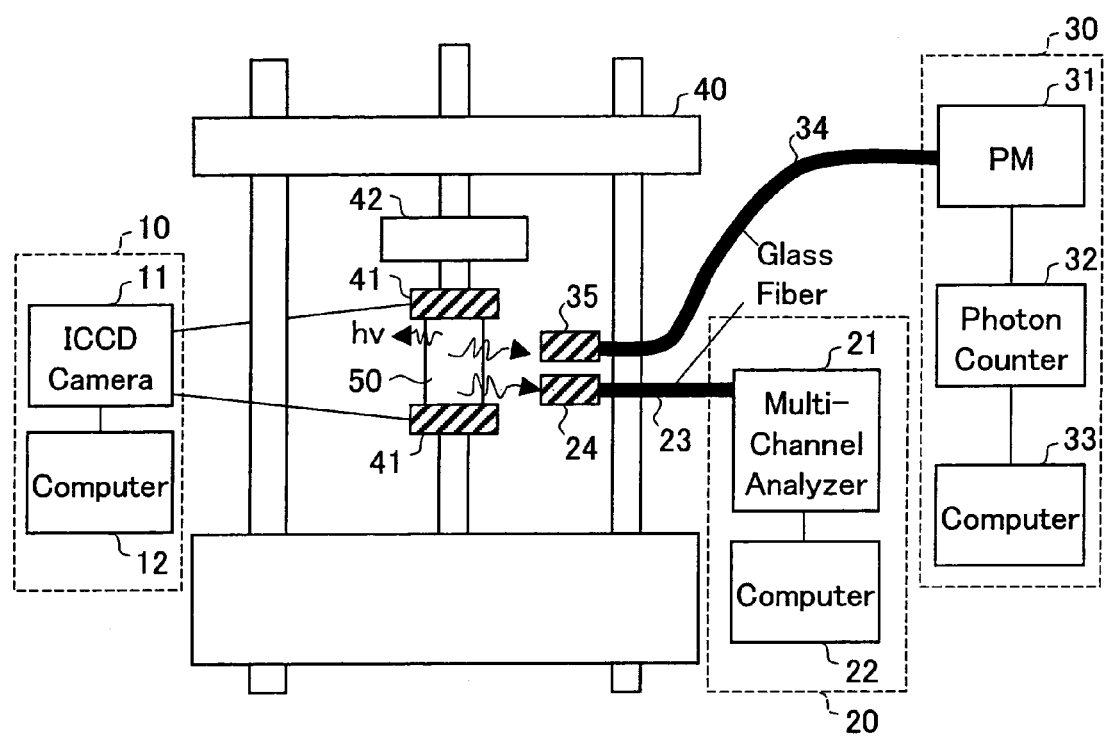
FIG. 13 is a schematic view showing an example of a measurement system for measuring stress-stimulated luminescence of a sample, an applied stress, or the like, in Examples 2-8.

Subsequently, as shown in FIG. 13, the luminous intensity, stress (deforming force), and strain were simultaneously measured while a stress was applied at a constant speed. The measurement was carried out using a measurement system including an image taking section 10, a spectrum measurement section 20, a luminous intensity measurement section 30, and a sample fixing section 40. In this measurement system shown in FIG. 13, the image taking section 10 is constituted by an ICCD camera 11 and a computer 12, the spectrum measurement section 20 is constituted by a multi-channel spectrum analyzer 21 and a computer 22, and the luminous intensity measurement section 30 is constituted by a PM (photomultiplier) 31, a photon counter 32, and a computer 33. It is noted that the image taking section 10, the spectrum measurement section 20, and the luminous intensity measurement section 30 are not necessarily arranged in this way. The multi-channel spectrum analyzer 21 is connected to a condensing lens 24 via a glass fiber 23, whereas the PM 31 is connected to a condensing lens 35 via a glass fiber 34. Each of these devices measures luminous intensity or the like.

The rectangular-parallelepiped sample 50 was fixed to a sample fixing section 40 so that a strain gauge 41 was provided on the crosswise surface (of 19.2 mm×7.5 mm). A stress was applied to the sample 50 by longitudinally (along the side of 54 mm) applying load by a loading cell 42. The entire surfaces of the sample were pictured by the ICCD camera of the image taking section, and the luminous intensity or the like was measured using measurement probes connected to, by glass fiber, the spectrum measurement section and the luminous intensity measurement section. While the experimentation, the strain forming speed by the stress application was varied. Table 1 shows the obtained luminous intensity in the elastic range.

TABLE 1

| Composition | Crystal Structure, Space Group | Stress-stimulated luminescent intensity in elastic-deformation rangeElastic range |
|---|---|---|
| Eu:SrAl$_{12}$O$_{19}$ | Hexagonal Structure, P6$_3$/mmc | 0 |
| Eu:SrAl$_4$O$_7$ | Hexagonal Structure, P6$_3$/mmc | 0 |
| Eu:Sr$_4$Al$_{14}$O$_{25}$ | Orthorhombic Crystal, Pmma | 0 |
| Eu:SrAl$_2$O$_4$ | α-SrAl$_2$O$_4$, Monoclinic Crystal, P2$_1$ | 100 |
|  | β-SrAl$_2$O$_4$, Hexagonal Structure, P6$_3$22 | 0 |
| Eu:Sr$_3$Al$_2$O$_6$ | Cubic Crystal, Pa-3 | 0 |

As the results in Table. 1 clearly show, stress-stimulated luminescence in the elastic range was not observed in crystals such as $Sr_3Al_2O_6$, which was a known stress-stimulated luminescent material.

As shown in Table. 1, only α-$SrAl_2O_4$ exhibited stress-stimulated luminescence in the elastic range. The crystal structure of this substance was monoclinic crystal. Spontaneous polarization occurs in this crystal phase, but does not occur in other crystal structures. On this account, stress-stimulated luminescence in the elastic range is exhibited by a crystal phase with spontaneous polarization. As a result of material development experiments over a long period of time, it has been proved that the rule above is applicable to other stress-stimulated luminescent bodies. Also, since a crystal phase with spontaneous polarization exhibits ferroelectricity, a stress-stimulated luminescent body in the elastic range has ferroelectricity. The luminescence is achieved in such a manner that strain energy is converted into electricity, and light is emitted by electroluminescence. As described above, a stress-stimulated luminescent material which emits light in response to stress in the elastic range has ferroelectricity and is electroluminescent.

Example 3

Figure 14:
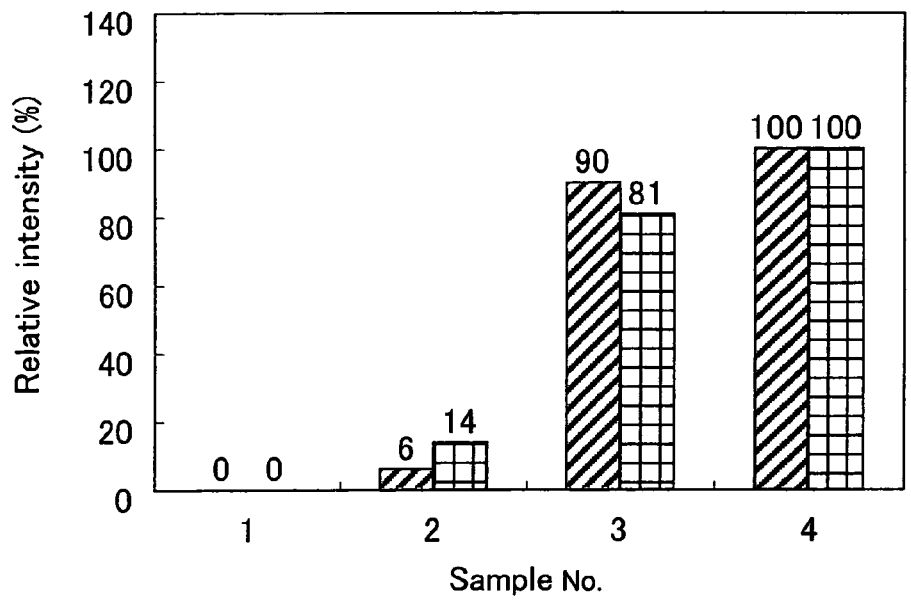
FIG. 14(a) a graph showing the variation of stress-stimulated luminous intensity in case where a $\alpha$-$SrAl_2O_4$ phase coexists with a non-luminescent crystal phase in Example 3.
FIG. 14(b) is a graph showing the variation of stress-stimulated luminous intensity in case where the $\alpha$-$SrAl_2O_4$ phase coexists with a non-luminescent crystal phase in Example 3.
Figure 14:
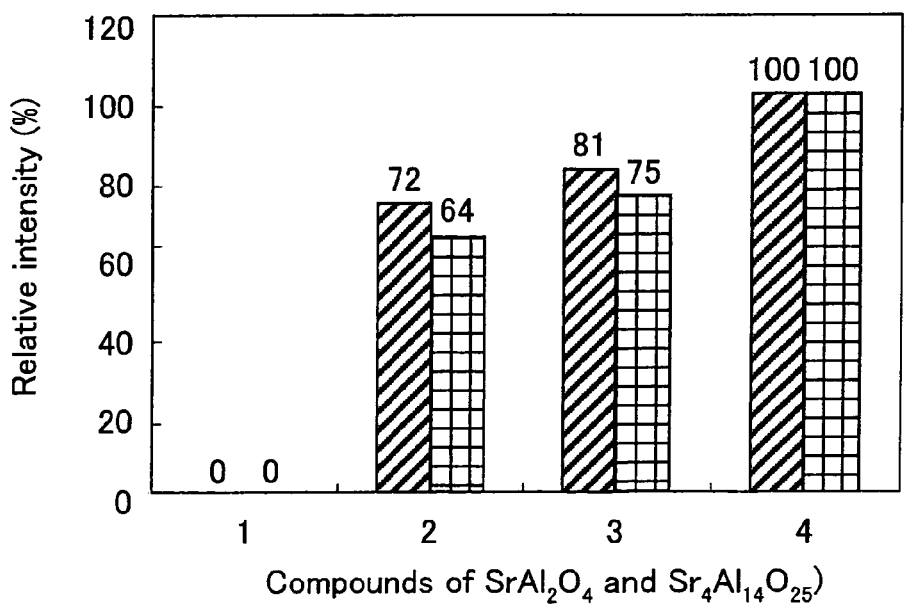
Figure 16:
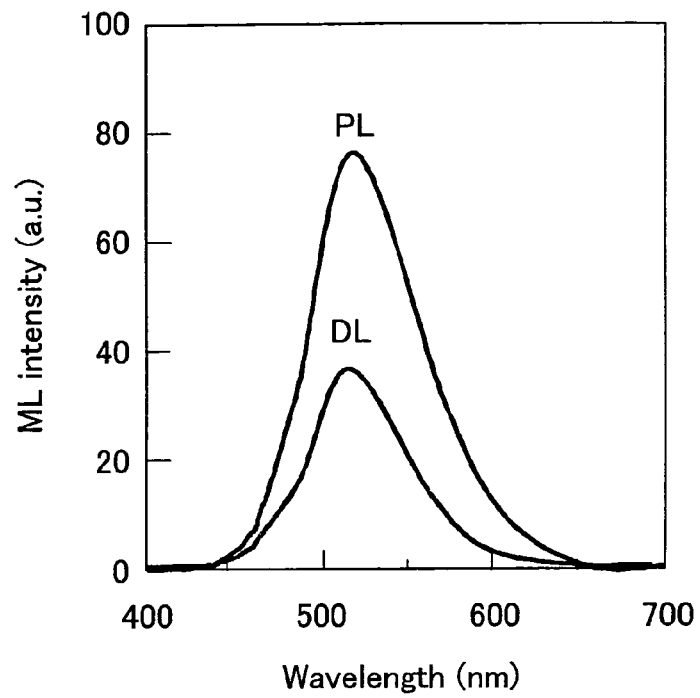
FIG. 16 is a graph showing the spectrum of stress-stimulated luminescence in case where the $\alpha$-$SrAl_2O_4$ phase coexists with another phase in Example 3.

In the same manner as Example 2, $SrCO_3$, $Eu_2O_3$, and $Al_2O_3$ were mixed so as to have various compositions. As a result, a crystal phase coexisting with the α-$SrAl_2O_4$ phase was synthesized. FIGS. 14(a) and 14(b) shows the variations of stress-stimulated luminous intensities in case where the α-$SrAl_2O_4$ phase coexisted with a non-luminous crystal phase. The result proved that, even if stress-stimulated luminescence was achieved because of the coexistence of the α-$SrAl_2O_4$ phase, the luminous intensity was low. On the other hand, the highest luminous intensity was achieved when only the α-$SrAl_2O_4$ phase was provided. As shown in FIGS. 15 and 16, the luminous intensity in the case of the coexistence changed in accordance with the variation of the stress, and the luminescent spectrum was peaked at 520 nm, as in the case where only the α-$SrAl_2O_4$ phase was provided.

Example 4

Figure 17:
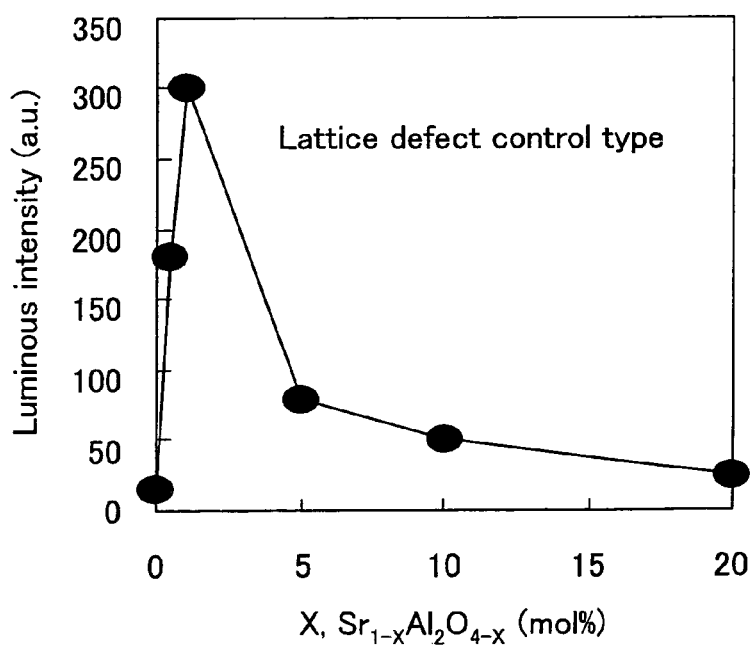
FIG. 17 shows the relationship between luminous intensity and lattice defect density in $\alpha$-$SrAl_2O_4$ phase in case where lattice defect is formed in Sr sites in Example 4.

Examples 2 and 3 confirmed that the highest luminous intensity was obtained in the case where only the α-$SrAl_2O_4$ phase was provided. Taking into account of this, it was assumed that forming lattice defect in a crystal structure was advantageous for further facilitating the strain. On this account, a lattice-defect-control sample, in which an amount of $Sr^{2+}$ ions was smaller than stoichiometry so that lattice defect was formed in Sr sites, was formed. As a result, as shown in FIG. 17, the luminous intensity was dramatically improved when an amount of lattice defect was optimal. When the amount of the defect was too small, the effect of the lattice defect was insufficient and the luminous intensity was low. On the other hand, when the amount of the defect was too large, the crystal structure was broken and hence the luminous intensity was also low. It was found that the luminous intensity was significantly improved by providing lattice defect while a pure-phase structure is maintained, i.e. only the $\alpha$-$SrAl_2O_4$ phase was provided.

Example 5

To further facilitate strain and improve luminescence, it was assumed to be advantageous to add, to $Sr^{2+}$, at least one type of: ions having higher valence than the $Sr^{2+}$; ions having lower valence than the $Sr^{2+}$; ions which are long in diameter; and ions which are short in diameter. On this account, using high purity reagents, stress-stimulated luminescent materials with different compositions were manufactured in the similar manner as Example 2, by weighing $SrCO_3$, $Eu_2O_3$, $Al_2O_3$, KI, NaI, $CaCO_3$, $BaCO_3$, $B_2O_3$, $MgCO_3$, $Ho_2O_3$ so as to achieve predetermined compositions and sufficiently mixing them. Table. 2 shows some of the obtained stress-stimulated luminescent materials exhibiting high luminous intensity.

TABLE 2

| Compositions | Relative Luminous Intensities |
|---|---|
| $Sr_{0.995}Al_2O_4$:$EU_{0.005}$ | 1 |
| $(Sr_{0.90}Na_{0.02}Sn_{0.005}Eu_{0.002})(Al_{1.98}In_{0.01})O_4$ | 80 |
| $(Sr_{0.80}K_{0.02}Ho_{0.02}Mg_{0.10}Eu_{0.005})(Al_{1.90}B_{0.05})O_4$ | 300 |
| $(Sr_{0.80}Ba_{0.15}Dy_{0.01}EU_{0.005})(Al_{1.99}Ga_{0.01})O_4$ | 350 |
| $(Sr_{0.60}Ba_{0.25}K_{0.01}Nd_{0.01}Eu_{0.005})(Al_{1.95}Si_{0.02}Ga_{0.01})O_4$ | 410 |
| $(Sr_{0.70}Zn_{0.02}Ba_{0.20}Tm_{0.02}Eu_{0.005})(Al_{1.93}B_{0.05}Ga_{0.02})O_4$ | 600 |
| $(Sr_{0.70}Ba_{0.20}Eu_{0.01}Tm_{0.01})Al_2O_4$ | 20 |
| $(Sr_{0.73}Ba_{0.25}Eu_{0.01})Al_2O_4$ | 7 |
| $(Sr_{0.88}Mg_{0.10}Eu_{0.005})Al_2O_4$ | 2 |
| $(Sr_{0.80}K_{0.02}Eu_{0.01}Ho_{0.02})Al_2O_4$ | 10 |
| $(Sr_{0.85}Ca_{0.10}Eu_{0.01}Dy_{0.02}Na_{0.02})(Al_{1.95}B_{0.05})O_4$ | 13 |
| $(Sr_{0.99}Eu_{0.005})(Al_{0.95}In_{0.01}B_{0.04})O_4$ | 5 |
| $(Sr_{0.99}Eu_{0.005})(Al_{0.98}Ga_{0.02})O_4$ | 3 |

The crystal structure of each stress-stimulated luminescent material was identified by X-ray diffraction. As a result, it was confirmed that all stress-stimulated luminescent materials had the $\alpha$-$SrAl_2O_4$ phase. Among stress-stimulated luminescent materials in which lattice defects were formed in both Sr sites and Al sites, the highest stress-stimulated luminescence in the elastic range was exhibited by a stress-stimulated luminescent material in which more than two types of ions having different valence were added to both types of sites.

Figure 18:
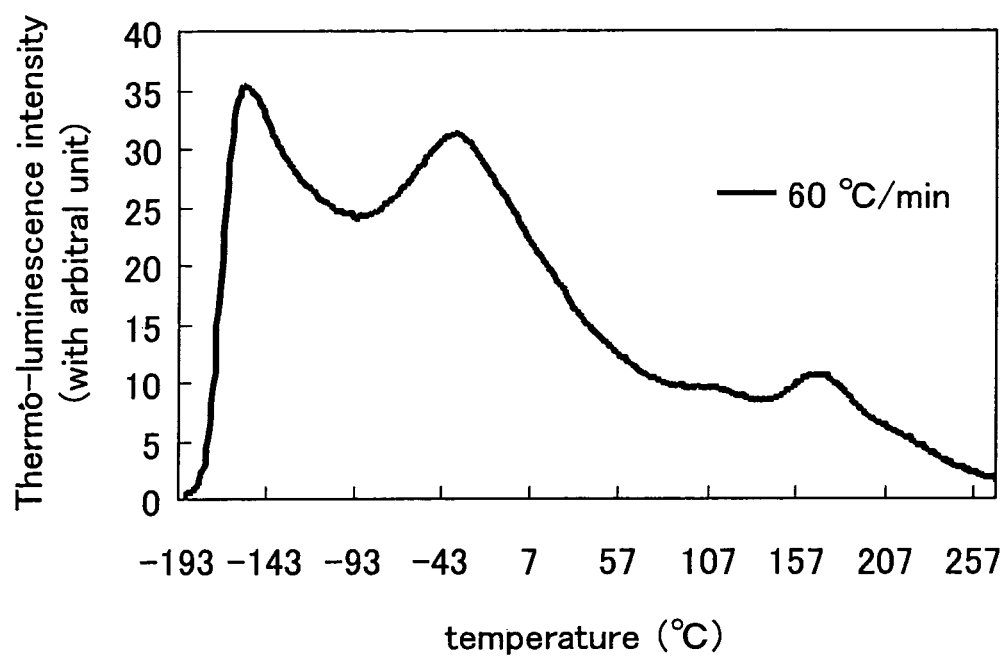
FIG. 18 is a chart showing an example of thermo-luminescence of the stress-stimulated luminescent material which has high stress-stimulated luminous intensity in Example 5.

FIG. 18 shows an example of a thermo-luminescence chart of the material exhibited high stress-stimulated luminous intensity. According to this figure, it was found that there were plural peaks of thermo-luminescence, and luminescence was exhibited in a wide temperature range. This was because plural lattice defects were formed. Also, since thermo-luminescence was observed around room temperatures, the thermo-luminescence on account of strain by deformation (i.e. luminescence mechanism using thermal generation) was exhibited concurrently with the luminescence mechanism using lattice defect. In other words, plural luminescence mechanisms using strains were concurrently used, so that the luminescence was further improved.

Example 6

Figure 20:
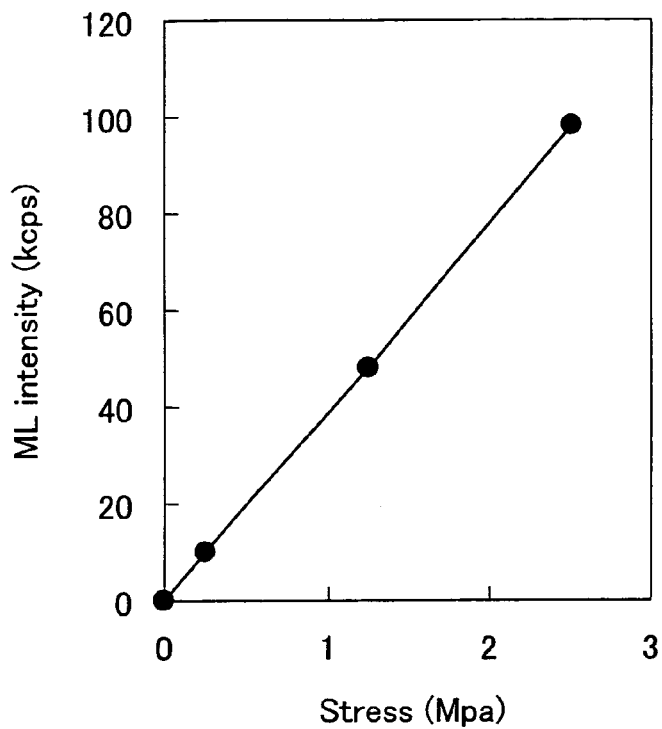
FIG. 20 is a graph showing the correlativity between luminous intensity and stress in the stress-stimulated luminescent material in Example 6.
Figure 21:
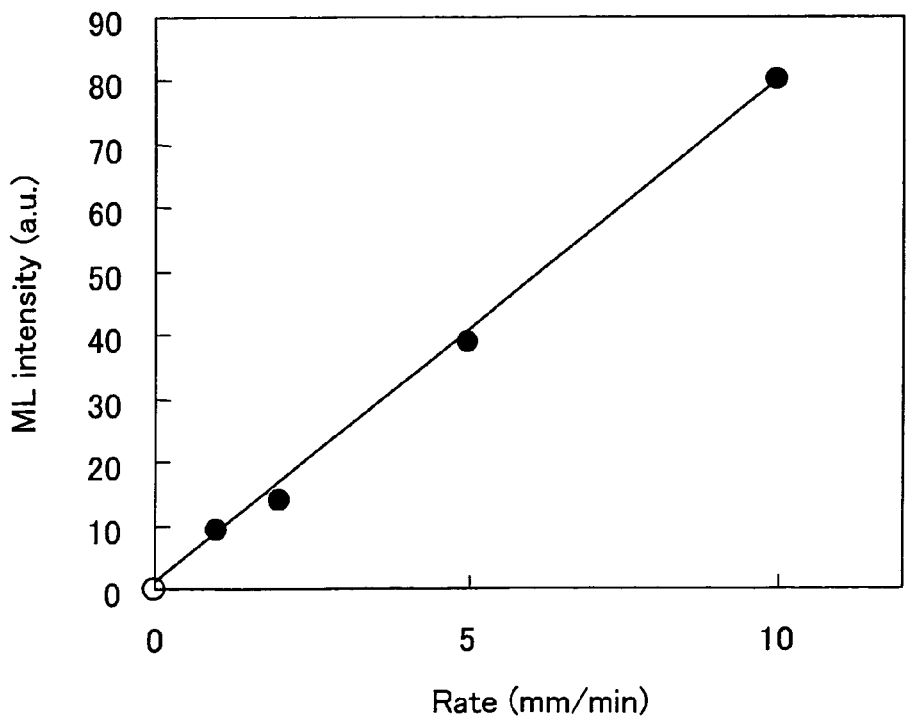
FIG. 21 is a graph showing the correlativity between luminous intensity and strain speed in the stress-stimulated luminescent material in Example 6.

A stress-stimulated luminescent material (powder) with the composition $(Sr_{0.60}K_{0.02}Ho_{0.02}Mg_{0.10}Ba_{0.15})(Al_{1.95}B_{0.05})O_4$ was mixed with epoxy resin at a weight ration of 1:1, and the luminous intensity, stress, and strain were simultaneously measured while a stress is applied, using a measurement system shown in FIG. 13, in a similar manner as Example 2. The results of this are shown in FIGS. 19, 20, and 21.

Figure 19:
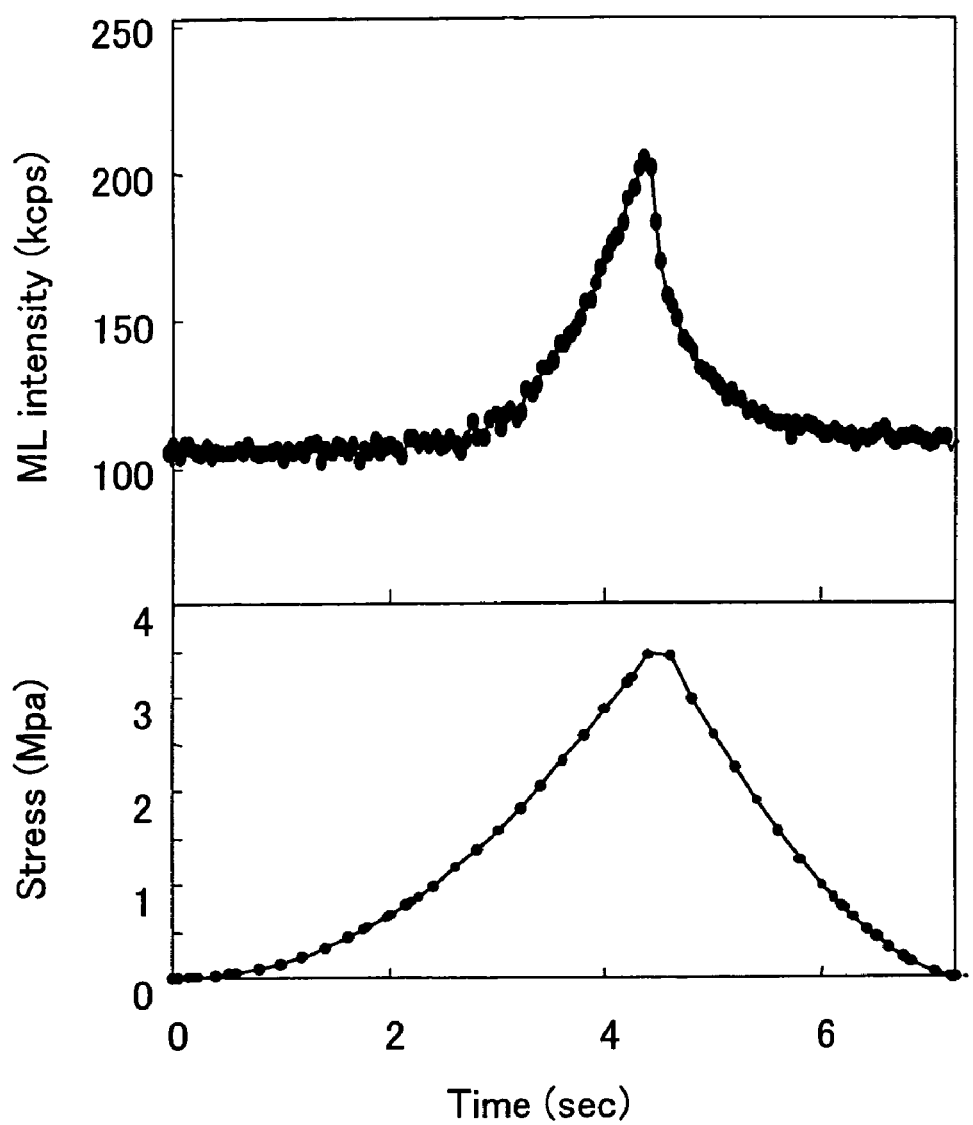
FIG. 19 is a chart showing the luminescence variation curve in case where a stress is applied to the stress-stimulated luminescent material in Example 6.

FIG. 19 shows the variation curve of the luminous intensity when a stress was applied. As the stress increased, the luminescence linearly increased. In this manner, plotting peak values of stress-stimulated luminescence and stress, which were obtained by experimentations with stresses at various peaks, it was found that these peak values were linearly in proportion to each other as shown in FIG. 20. (In the figure, $\dot\epsilon=0.3\times10^{-3}$ 1/s) Also, plotting the relationship between stress-stimulated luminescence values and strain speeds at the time experimentations with various strain speeds, it was found that these values were in proportion to each other. (In the figure, $\sigma_{max}=2.28$ MPa)

Regarding the stress-stimulated luminous intensity from a start period to a period t, values figured out by integration by time proved that, as indicated by the following equation (1), the variation of the strain energy density from the start period to the period t is proportional.

[Equation 1]

$$\int_{t0}^{t} [I(t) - I(t_0)] \, dt = k[u(t) - u(t_0)] \quad (1)$$

(where I [unit: J/(sec-$m^2$)] indicates stress-stimulated luminous intensity, u [unit: J/m3] indicates the strain energy density, t [unit: sec] indicates time length, $t_o$ [unit: sec] indicates moment, and k [unit: m] indicates a proportion coefficient)

In the elastic range, as shown in the following equation (2), the variation was in proportion to a value figured out by integrating the product of the stress and the strain by time. In the equation, the proportion coefficient was k/2.

$$\int_{t0}^{t} [I(t) - I(t_0)] \, dt = \frac{k}{2}[\sigma(t)\cdot\varepsilon(t) - \sigma(t_0)\cdot\varepsilon(t_0)] \quad (2)$$

(where $\sigma$ indicates stress and $\epsilon$ indicates strain)

The equation (2) was differentiated. As a result, the relationship indicated by the following equation (3) was given.

$$I(t) - I(t_0) = k\sigma(t)\cdot\dot\varepsilon(t) \quad (3)$$

(where $\dot\epsilon$ indicates strain speed, which is in proportion to the rate of change of stress and in inverse proportion to the elastic coefficient)

A value figured out by multiplying the proportion coefficient k by the product of the stress at an optional time t and the strain speed at the time t was equal to the difference between the stress-stimulated luminous intensity at the time t and the stress-stimulated luminous intensity at the start time $t_0$. The result shown in the equation (3) was in agreement with the experimentation results shown in FIGS. 20 and 21, and the stress-stimulated luminous intensity was in proportion to both the stress and strain speed. Therefore, the stress-stimulated luminous intensity is in proportion to strain energy, and also in proportion to the stress distribution when the strain speed is constant. Therefore, when the stress-stimulated luminescent material is applied to the object, remote monitoring is feasible because the stress distribution of the object is in proportion to the luminescence image.

According to the equation (3), the important points for an effective luminescence method to obtain high stress-stimulated luminescence are the following two:

Select an object having a low elastic coefficient; and
Select a structure having no stress relaxation.

Example 7

A paste obtained by mixing a stress-stimulated luminescent material powder with epoxy resin was applied onto various sample pieces (40×3×200 mm) so that flat plates (films) which were 10 μm, 50 μm, and 100 μm thick were formed on each of the sample pieces. Using the device shown in FIG. 13 and a tensile jig, a stress cycle was repeatedly exerted onto the sample pieces. With these conditions, the correlativity between stress and stress-stimulated luminescence was measured. Table. 3 shows a comparison between stress-stimulated luminous intensities of stress-stimulated luminescent films which were 50 μm thick when a stress cycle with a frequency of 1 Hz was applied.

TABLE 3

| Stress-stimulated luminescent Body | Supporting Bodies | Elastic Coefficients of Supporting Bodies | Luminous Intensity Stress: 0.1 MPa |
|---|---|---|---|
| Stress-stimulated luminescent Film 50 μm thick | Acrylic Resin | 3 GPa | 100 |
| | Epoxy Resin | 2 GPa | 150 |
| | Paper | 200 MPa | 20000 |
| | Rubber | 10 MPa | 300 |
| | Alumina | 300 GPa | 5 |
| | SUS306 | 20 GPa | 25 |

As the result clearly shows, the luminescence at a constant stress increased as the elastic coefficient of the sample piece decreased. However, as to a material such as rubber which has high stress relaxation, the stress-stimulated luminescence was not very high even if the elastic coefficient was low. This was presumably because the variation speed of the stress was relaxed. Also, it turned out to be very effective to introduce an adhesive suitable for the sample piece, because cracks and breakings of the stress-stimulated luminescent film were not observed at all in the experimentation. As the adhesive, commercially-available cyanoacrylate adhesive and high-density epoxy adhesive were particularly effective. This was presumably because these adhesives had low stress relaxation as compared to other types of adhesives.

When the stress-stimulated luminescent material was molded into a thin film, the stress-stimulated luminescent intensity was high, while the film was easily strained but not easily broken. It was also found that the supporting body of the film was preferably made of a material whose elastic coefficient is similar to that of the film.

Example 8

Figure 22:
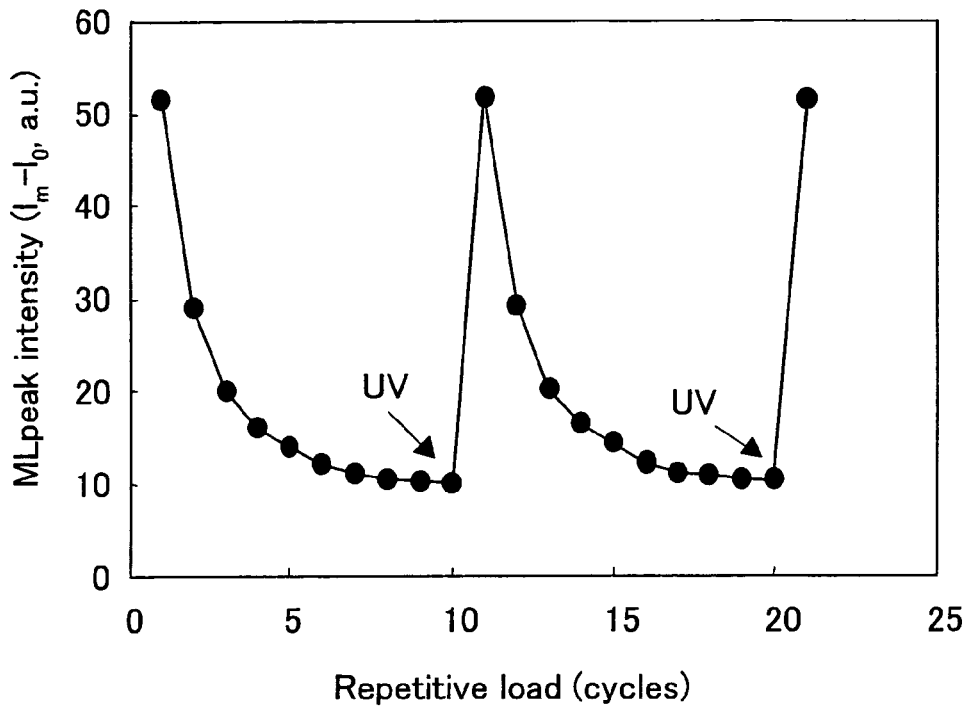
FIG. 22 is a graph showing the variation of stress-stimulated luminescence peaks when ultraviolet light irradiation is carried out and not carried out, in case where a stress cycle of 1 Hz is applied.
Figure 23:
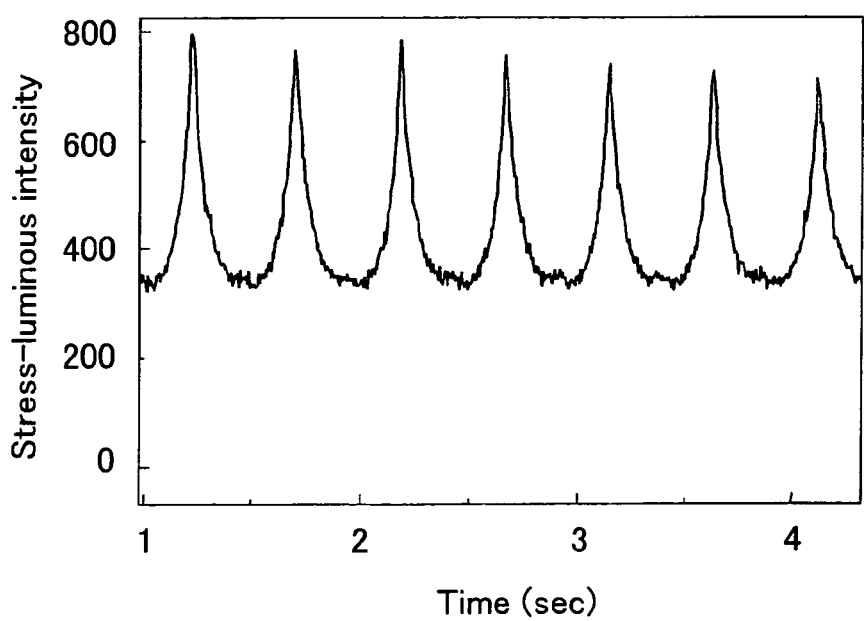
FIG. 23 is a graph showing the variation of luminous intensity in case where a stress cycle of 1 Hz is applied while ultraviolet light is applied.

With the conditions in Example 7, a case where ultraviolet light irradiation was performed was compared with a case where ultraviolet light irradiation was not performed, in regard to the variation of the stress-stimulated luminescence peak when a stress cycle with a frequency of 1 Hz was applied. As to the conditions of the ultraviolet light irradiation, ultraviolet light with 365 nm was irradiated for one minute. As a result, as shown in FIG. 22, in response to the repeated stresses, attenuation occurred before a stable state, and the attenuated stress-stimulated luminescence was regained by the irradiation of the ultraviolet light. Also, the variation of the stress-stimulated luminescence peak when a stress cycle with a frequency of 1 Hz was applied while ultraviolet light was applied was evaluated. As a result, as shown in FIG. 23, the variation was stable in response to the repeated stresses.

Example 9

A stress-stimulated luminescent body having a laminated structure was manufactured by providing a stress-stimulated luminescent material about 10-μm thick on the bottom of a commercially-available paper cup. Very bright light was observed even in daylight, when the bottom (outer surface) of the paper cup was slightly pushed by a finger. The luminous intensity was at least 10 cd/m$^2$. This proved that a diaphragm structure with which strain was easily applied was tremendously effective as a method of effectively causing a stress-stimulated luminescent material to emit light.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

As described above, by the present invention, 5 basic luminescence mechanism for obtaining a high-luminosity stress-stimulated luminescent material were clarified, and based on this, a stress-stimulated luminescent material which can realize high luminous intensity and a method of use thereof were developed. As a result of this, it is possible to effectively obtain an excellent stress-stimulated luminescent material which has characteristics such as high intensity, long afterglow, long response time and the like, as compared to conventional materials.

As described above, since a luminescent mechanism was clarified for the first time, the present invention makes it possible to effectively obtain a stress-stimulated luminescent material whose luminous intensity is higher than conventional materials. The present invention can therefore be suitably used for a material production industry such as manufacturers of stress-stimulated luminescent materials and/or stress-stimulated luminescent bodies, and also for novel sensing technologies. On this account, the present invention is applicable to industrial fields such as electronic components and electronic/optical devices, e.g. manufacturing sensors, and also to various industrial fields such as safety management, measurement, robot, toy, and the like.

The invention claimed is:

1. A stress-stimulated luminescent material which emits light in response to a mechanical effect, the stress-stimulated luminescent material comprising a base material,
   the base material being α-SrAl$_2$O$_4$,
   to realize the luminescence mechanism using the lattice defect, at least two types of metal ions being added, as central ions of defect center, to the base material,
   at least one type of the added metal ions substituting Sr sites of the α-SrAl$_2$O$_4$, and
   the metal ions substituting Sr sites being larger in diameter than the Sr.

2. The stress-stimulated luminescent material as defined in claim 1,
wherein, the metal ions which are larger in ion diameter than the Sr are Ba and/or K.

3. The stress-stimulated luminescent material as defined in claim 1,
wherein, the metal ions added as the central ions are made up of two or more types of metal ions having different valence.

4. A stress-stimulated luminescent material which emits light in response to a mechanical effect, the stress-stimulated luminescent material comprising a base material,
the base material being $\alpha$-$SrAl_2O_4$
to realize the luminescence mechanism using the lattice defect, at least two types of metal ions being added, as central ions of defect center, to the base material,
at least two types of the added metal ions substituting Sr sites of the $\alpha$-$SrAl_2O_4$, and
in case where metal ions which are smaller in ion diameter than the Sr and metal ions which are larger in ion diameter than the Sr are both added as the metal ions, substituting Sr sites, an amount of the metal ions in total being smaller than stoichiometry.

5. The stress-stimulated luminescent material as defined in claim 4,
wherein, the metal ions added as the central ions are made up of two or more types of metal ions having different valence.

6. A stress-stimulated luminescent material which emits light in response to a mechanical effect, the stress-stimulated luminescent material comprising a base material,
the base material being $\alpha$-$SrAl_2O_4$,
to realize the luminescence mechanism using the lattice defect, as least two types of metal ions being added, as central ions of defect center, to the base material, and
at least one type of the added metal ions substituting the Al sites of the $\alpha$-$SrAl_2O_4$.

7. The stress-stimulated luminescent material as defined in claim 6,
wherein, the metal ions added as the central ions are smaller in ion diameter than Al.

8. The stress-stimulated luminescent material as defined in claim 7,
wherein, the metal ions smaller in ion diameter than the Al are Si or B.

9. The stress-stimulated luminescent material as defined in claim 6,
wherein, the metal ions added as the central ions are larger in ion diameter than the Al.

10. The stress-stimulated luminescent material as defined in claim 9,
wherein, the metal ions which are larger in ion diameter than the Al are Ga or In.

11. The stress-stimulated luminescent material as defined in claim 6,
wherein, the metal ions which are added as the central ions and substitute the Al sites of the $\alpha$-$SrAl_2O_4$ are 0.1 to 20 mol % of the Al.

12. The stress-stimulated luminescent material as defined in claim 6,
wherein, the metal ions added as the central ions are made up of two or more types of metal ions having different valence.

* * * * *